(12) United States Patent
Kabano et al.

(10) Patent No.: US 9,811,534 B2
(45) Date of Patent: Nov. 7, 2017

(54) FILE SERVER, INFORMATION SYSTEM, AND CONTROL METHOD THEREOF

(71) Applicant: HITACHI, LTD., Tokyo (JP)

(72) Inventors: Shigeyuki Kabano, Yokohama (JP); Nobuyuki Saika, Yokosuka (JP); Takayuki Fukatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 13/806,935

(22) PCT Filed: Dec. 17, 2012

(86) PCT No.: PCT/JP2012/008046
§ 371 (c)(1),
(2) Date: Dec. 26, 2012

(87) PCT Pub. No.: WO2014/097344
PCT Pub. Date: Jun. 26, 2014

(65) Prior Publication Data
US 2014/0172792 A1    Jun. 19, 2014

(51) Int. Cl.
*G06F 7/00*     (2006.01)
*G06F 17/30*    (2006.01)

(52) U.S. Cl.
CPC .. *G06F 17/30215* (2013.01); *G06F 17/30171* (2013.01); *G06F 17/30221* (2013.01); *G06F 17/30578* (2013.01)

(58) Field of Classification Search
CPC ............................................... G06F 17/30212
USPC ......................................................... 707/634
See application file for complete search history.

(56) References Cited

U.S. PATENT DOCUMENTS

| | | | |
|---|---|---|---|
| 2008/0155310 A1* | 6/2008 | Langen et al. | 714/6 |
| 2011/0246429 A1* | 10/2011 | Prahlad et al. | 707/679 |
| 2012/0016838 A1 | 1/2012 | Arai et al. | |

FOREIGN PATENT DOCUMENTS

| | | |
|---|---|---|
| JP | 7-141245 A | 6/1995 |
| JP | 2004-252673 A | 9/2004 |

OTHER PUBLICATIONS

Anonymous: "Roaming user profile", Nov. 13, 2012, pp. 1-5, Retrieved from the Internet: URL: http://en.wikipedia.org/w/index.php?title=Roaming_user_profile&oldid=522858615.
Japanese Office Action received in corresponding Japanese Application No. 2015-511536 dated Feb. 9, 2016.

(Continued)

*Primary Examiner* — Ajith Jacob
(74) *Attorney, Agent, or Firm* — Mattingly & Malur, PC

(57) ABSTRACT

A file server is coupled to a plurality of user terminals and a remote file server. The file server, stores, in a storage device, data of files received from the plurality of user terminals, replicates the files to the remote file server, stubs the files stored in storage, and, upon receiving an access request from the user terminal, reads out data of the file from storage and transmits the data to the user terminal if a file related to the access request is not stubbed. If a file related to the access request is stubbed, the file server recalls data of the file from the remote file server and transmits data of the file to the user terminal. The file server replicates, to the remote file server, data of a user who performs a session disconnection request to the file server within a certain time in preference to another user.

17 Claims, 24 Drawing Sheets

(56) References Cited

OTHER PUBLICATIONS

Umehara, K., "Full Mastership of IntelliMirror, Thorough Dissection of IntelliMirror", ASCII Network PRO, ASCII Corporation, May 1, 2000, vol. 5, No. 5, 49th Issue, pp. 194-199.
Chinese Office Action received in corresponding Chinese Application No. 201280075665.8 dated May 3, 2017.
Japanese Office Action received in corresponding Japanese Application No. 2016-141758 dated Aug. 1, 2017.

\* cited by examiner

<Supplementation>
u → Abbreviation of 'user', g → Abbreviation of 'group',
o → Abbreviation of 'other' (other than 'user')
r → Abbreviation of 'read', x → Abbreviation of 'execute',
w → Abbreviation of 'write'

Disconnecting user management processing

Method A replication processing

| User name | Moving destination base | User IP | Number of times of movement | Average moving time | Data transfer rate |
|---|---|---|---|---|---|
| user00 | 10.203.54.88 | 10.210.76.55 | 55 | 60 Min | 1Mbyte/s |
| user00 | 10.203.55.21 | 10.210.76.55 | 44 | 90 Min | 2Mbyte/s |
| user00 | 10.203.42.50 | 10.210.76.55 | 53 | 50 Min | 7Mbyte/s |
| user01 | 10.203.56.31 | 10.210.76.55 | 32 | 60 Min | 3Mbyte/s |
| user01 | 10.203.58.45 | 10.210.76.55 | 11 | 70 Min | 4Mbyte/s |

132a, 132b, 132c, 132d, 132e, 132f — 132

Moving frequencies of respective users

| User name | User IP | Session disconnection time | Transfer system | Band speed |
|---|---|---|---|---|
| user00 | 10.210.76.55 | 2012-05-12_13:10 | Transfer system A | 100Mbyte/s |
| user01 | 10.210.76.56 | 2012-05-12_14:10 | Transfer system B | 200Mbyte/s |
| user02 | 10.210.76.57 | 2012-05-12_15:10 | Transfer system A | 200Mbyte/s |
| user03 | 10.210.76.58 | 2012-05-12_16:10 | Transfer system B | 100Mbyte/s |

Session connection processing (Edge side)

FILE SERVER, INFORMATION SYSTEM, AND CONTROL METHOD THEREOF

TECHNICAL FIELD

The present invention relates to a file server, an information system including a file server connected to a communication network, and a control method thereof and relates to a technique for managing a file.

BACKGROUND ART

A form in which a company or an individual purchases a server and software at it's own expenses and uses the server and the software has been mainly used. However, in order to reduce TCO (Total Cost of Ownership), cloud computing for using a server and software through the Internet tends to spread.

PTL 1 discloses a technique in which, in a system in which storage apparatuses (local storage apparatus and local file servers) of a plurality of bases (called Edges) and a storage apparatus (a remote storage apparatus and a remote file server) of a data center (called Core) are connected, a file of a base is copied to the data center, the copied file is stubbed and managed in the base, and, when access to the file stubbed in the base occurs, the file is read out from the data center side.

In the system in PTL 1, when a user writes a file in a file system of the local storage apparatus, the local storage apparatus periodically performs replication of the file to the core side. In processing of this replication, time and a period of time when the replication processing can be executed, an amount of data that can be transmitted, and the like are limited in some cases.

The local storage apparatus manages the file as a cache file even after the replication without deleting the file.

Thereafter, when a file system capacity on the Edge side reaches a certain threshold, a cache file with early access date and time is changed to a stub file (stubbed). The stub file is a file that does not have reference to actual data in the Edge and retains reference to actual data in the Core.

In such a state, when access to the stub file occurs from a user, since actual data of the file is not present on the Edge side, processing (recall processing) for downloading the actual data from the Core side to the Edge side is executed.

CITATION LIST

Patent Literature

[PTL 1] United States Patent Application Publication No. 2012/0016838

SUMMARY OF INVENTION

Technical Problem

In the system described in PTL 1, it is not taken into account that a user moves between Edges and accesses data of the user from anther Edge at a moving destination. In such a system, there is a problem in that, for example, when the user moves to another Edge and, in the Edge, accesses data in a directory exclusive for the user (a home directory), in the moving destination Edge, the user cannot refer to a file updated in the moving origin Edge until the file updated in the moving origin Edge is replicated to the Core side. This problem tends to occurs, in particular, when updated data cannot be entirely transmitted in one replication processing if the time and the period of time when the replication can be performed and the amount of data are limited.

Therefore, it is an object of the present invention to provide a technique for allowing a user to appropriately refer to, in a file server of another base, a file managed in a file server of one base.

Solution to Problem

A file server according to an aspect of the present invention is coupled to a plurality of user terminals and a remote file server. The file server, comprising a processor configured to, stores, in a storage device, data of files received from the plurality of user terminals, replicates the files to the remote file server, stubs the files stored in the storage device, and, upon receiving an access request from the user terminal, reads out data of the file from the storage device and transmits the data to the user terminal if a file related to the access request is not stubbed, and, recall data of the file from the remote file server and transmits data of the file to the user terminal if a file related to the access request is stubbed. The file server replicates, to the remote file server, data of a user who performs a session disconnection request to the file server within a certain time in preference to another user.

Advantageous Effects of Invention

According to the present invention, it is possible to appropriately store, in the remote file server, a file updated in the file server. Therefore, for example, it is possible to appropriately refer to a file updated in a certain file server from another file server connected to the remote file server.

DESCRIPTION OF EMBODIMENT

Figure 1:
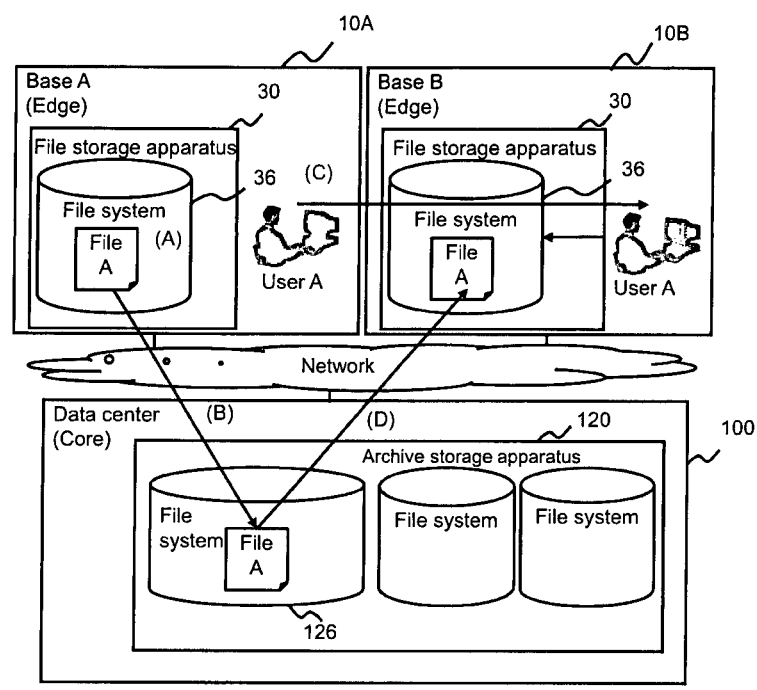
FIG. 1 is a diagram showing an overview of an information system according to a first embodiment.

Several embodiments are explained with reference to the drawings. The embodiments explained below do not limit the inventions according to patent claims. Note that all of components and combinations of the components explained in the embodiments are not always essential for the solving means of the invention.

Note that, in the following explanation, information of the present invention is sometimes explained by representation such as "aaa table". However, these kinds of information may be represented by other than a data structure such as a table. Therefore, to indicate that the information does not depend on the data structure, "aaa table" or the like is sometimes referred to as "aaa information". Information for identifying "bbb" of the present invention is sometimes explained by representation such as "bbb name". However, the information for identifying "bbb" is not limited to a name and only has to be information with which "bbb" can be identified such as an identifier, an identification name, and an address.

In the following explanation, "program" is used as a subject. However, the program performs, while using a memory and an I/F (interface), processing defined by being executed by a processor (typically, a CPU (Central Processing Unit)). Therefore, the processor may be used as a subject in the explanation. Processing disclosed with the program used as the subject may be processing performed by a file server (e.g., a file storage apparatus or an archive storage apparatus explained below). A part or all of the program may be realized by dedicated hardware. Various programs may be installed in respective computers by a program distribution server or a storage medium readable by the computers. The storage medium may be, for example, an IC card, an SD card, or a DVD.

Various terms are explained. "Core" is a base (a collection base) including a remote computer system and is, for example, a base that collectively manages servers and storage apparatuses or a base that provides a cloud service. "Edge" is a base including a local computer system and is, for example, a base where a user actually performs business such as a branch, a business place, or a remote office. "Stub" is an object (metadata) with which storage destination information (information representing a link destination) of a file is associated. "Stubbing" means, concerning a file of the Edge (the computer system of the Edge), deleting actual data and retaining only management information. A stubbed file does not retain actual data. Therefore, when the file is accessed, it is necessary to acquire the actual data from the computer system of the Core. Therefore, in the access to the stubbed file, access performance is deteriorated compared with a normal file.

"Replication" means copying a file present in the Edge to the Core. "Migration" means replicating the file present in the Edge to the Core and stubbing the file of the Edge. "Archive" is a general term of the migration and the replication. "Recall" means, concerning a stubbed file, acquiring actual data from the Core and retaining the actual data in the file of the Edge. "Cache" means a file remaining in the Edge after the replication from the Edge to the Core or means leaving the file in the Edge in that way. Access to the cache usually has access performance equivalent to access performance to the normal file. "Home directory" means, in a file system, a directory exclusive for a user allocated to each of users and includes a directory and a file of the user as subordinates.

First, an information system according to a first embodiment is explained.

FIG. 1 is a diagram showing an overview of the information system according to the first embodiment.

In an Edge 10A (also referred to as base A) of the information system, when a file A of a file system 36 of a file storage apparatus 30 is updated by a user A ((A) in the figure), the file storage apparatus 30 executes, at a predetermined point, for example, time when the user A disconnects a session to the file storage apparatus 30, or periodically, concerning a file (the file A, etc.) of the file system 36, replication to an archive storage apparatus 120 and stubbing of the file ((B) in the figure).

Thereafter, when the user A moves from the base A to a base B (an Edge 10B) ((C) in the figure) and connects a session to the file storage apparatus 30 of the base B, the file storage apparatus 30 of the base B recalls the file A from a file system 126 of the archive storage apparatus 120 of a Core 100 and stores the file A in the file system 36 ((D) in the figure). When the file A is recalled in the base B, the file A is already replicated to the file system 126 of the Core 100. Therefore, it is possible to appropriately perform the recall of the file A.

Figure 2:
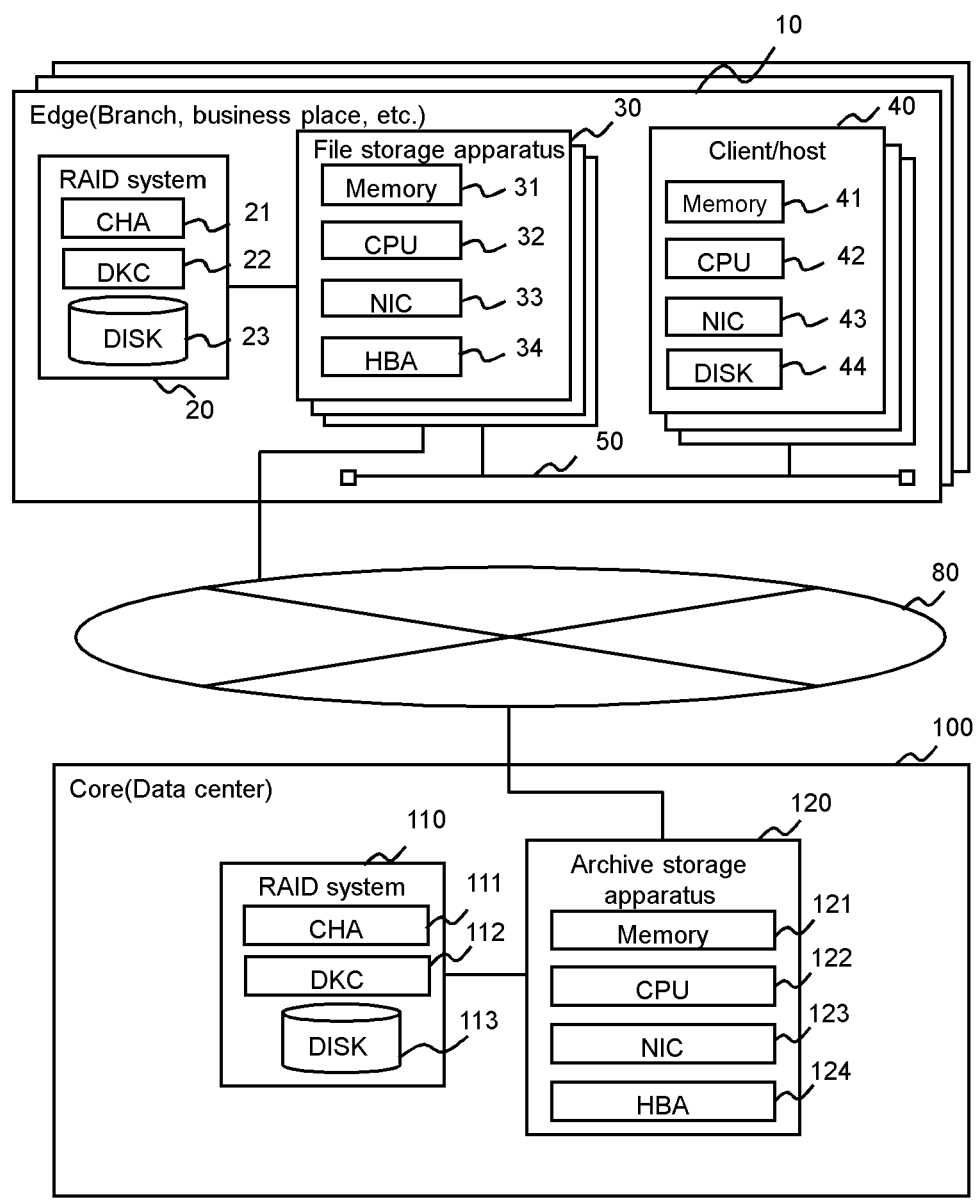
FIG. 2 is a hardware configuration diagram of the information system according to the first embodiment.

FIG. 2 is a diagram showing a hardware configuration of the information system according to the first embodiment.

Hardware of the information system is arranged in the Edge 10 and the Core 100. In an example shown in FIG. 2, a plurality of the Edges 10 and a singularity of the Core 100 are provided. However, a singularity of the Edge 10 and/or a plurality of the Cores 100 may be provided.

A computer system of the Edge 10 includes a RAID (Redundant Array of Independent (or Inexpensive) Disks) system 20, one or more file storage apparatuses 30, and one or more clients (e.g., personal computers)/hosts (e.g., servers) 40. The file storage apparatus 30 is an example of a local server. The file storage apparatuses 30 are connected to the clients/hosts 40 via, for example, a communication network 50 (e.g., a LAN (Local Area Network)). The file storage devices 30 are connected to the RAID system 20 via, for example, a communication network (e.g., a SAN (Storage Area Network)).

The RAID system 20 includes a CHA (Channel Adaptor) 21, a DKC (Disk Controller) 22, and a DISK 23. The CHA 21 and the DISK 23 are connected to the DKC 22. The CHA 21 is a communication interface device connected to the file storage apparatus 30. The DKC 22 is a controller. The DISK 23 is a physical storage device of a disk type (e.g., a HDD (Hard Disk Drive)). As the physical storage device, a physical storage device of another type (e.g., a flash memory device) may be adopted. A singularity of the DISK 23 is shown in FIG. 2. However, actually, a plurality of the DISKs 23 are provided (or a singularity of the DISK 23 may be adopted as shown in the figure). One or more RAID groups may be configured by the plurality of DISKs 23. Although not shown in the figure, the RAID system 20 includes a memory that stores a program executed in the RAID system 20 and a CPU (Central Processing Unit) that executes the program.

The RAID system 20 receives, in the CHA 21, an I/O request of a block level transmitted from the file storage apparatus 30 and executes an I/O to an appropriate DISK 23 on the basis of the control by the DKC 22.

The file storage device 30 includes a memory 31, a CPU 32, a NIC (Network Interface Card) 33, and a HBA (Host Bus Adaptor) 34. The CPU 32 is connected to the memory 31, the NIC 33, and the HBA 34.

The NIC 33 is a communication interface device that communicates with the archive storage apparatus 120 and the client/host 40.

The HBA 34 is a communication interface device that communicates with the RAID system 20.

The memory 31 is a storage region (e.g., a RAM (Random Access Memory) or a ROM (Read Only Memory)) that the CPU 32 can direct read and write. In the file storage apparatus 30, a program (e.g., an OS (Operating System)) for controlling the file storage apparatus 30 is read on the memory 31. The CPU 32 executes the program. The file storage apparatus 30 may include a storage resource of another type in addition to or instead of the memory 31. The memory 31 is an example of a storage device.

The file storage apparatus 30 receives an I/O request of a file level from the client/host 40 via the NIC 33. The file storage apparatus 30 creates an I/O request (an I/O request of a block level) for an I/O of a data block that comprises a file designated by the received I/O request. The file storage apparatus 30 transmits the I/O request of the block level to the RAID system 20 via the HBA 34.

The client/host 40 includes a memory 41, a CPU 42, a NIC 43, and a DISK 44. The client/host 40 may include a storage resource of another type in addition to or instead of the memory 41 and/or the DISK 44.

The client/host 40 reads a program (a program (e.g., an OS) for controlling the client/host 40) stored in the DISK 44 on the memory 41. The CPU 42 executes the program. The client/host 40 transmits an I/O request of a file level to the file storage apparatus 30 via the NIC 43.

The computer system of the Core 100 includes a RAID system 110 and the archive storage apparatus 120. The archive storage apparatus 120 is an example of a remote file server. The RAID system 110 is connected to the archive storage apparatus 120.

The RAID system 110 includes a CHA 111, a DKC 112, and a DISK 113. In FIG. 2, the configuration of the RAID system 110 and the configuration of the RAID system 20 are the same. Therefore, the RAID system 110 receives, in the CHA 111, an I/O request of a block level transmitted from the archive storage apparatus 120 and executes I/O to and from an appropriate DISK 113 on the basis of the control by the DKC 112. Note that the configuration of the RAID system 110 and the configuration of the RAID system 20 may be different.

The archive storage apparatus 120 includes a memory 121, a CPU 122, a NIC 123, and a HBA 124. A storage resource of another type may be provided instead of or in addition to the memory 121. In the archive storage apparatus 120, a program (e.g., an OS) for controlling the archive storage apparatus 120 is read on the memory 121. The CPU 122 executes the program. The archive storage apparatus 120 communicates with the file storage apparatus 30 via the NIC 123 and the communication network 80. The archive storage apparatus 120 performs access in a block unit to the RAID system 110 via the HBA 124.

Figure 3:
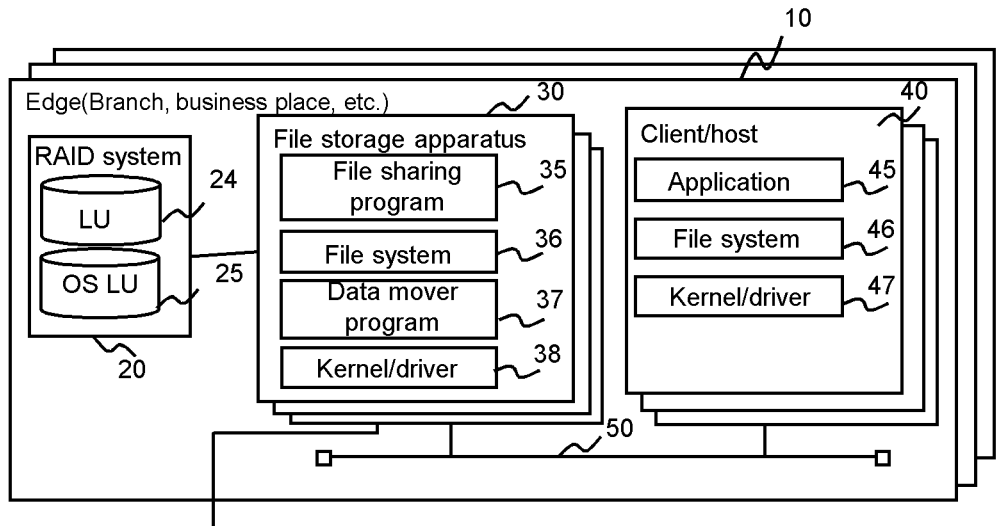
FIG. 3 is a software configuration diagram of the information system according to the first embodiment.

FIG. 3 is a software configuration diagram of the information system according to the first embodiment.

The RAID system 20 (110) includes a plurality of LUs (Logical Units) 24 (114) and an OS LU (Logical Unit for OS) 25 (115). The LU 24 (114) is a logical storage device provided to a host apparatus such as the file storage apparatus 30 (the archive storage apparatus 120) and is created on the basis of a storage region of the DISK 23 (113). The LU 24 (114) may be a substantive LU based on one or more DISKs 23 (113) or may be a virtual LU conforming to Thin Provisioning. The LU 24 (114) includes a plurality of blocks (storage regions). A file is stored in the LU 24 (114).

The OS LU 25 (115) is a logical storage device. The OL LU 25 (115) may be a substantive LU based on one or more DISKs 23 (113). In the OS LU 25 (115), a program or the like for controlling the file storage apparatus 30 or the archive storage apparatus 120 or all or a part of file system configuration information 200 explained below may be stored.

In the memory 31 of the file storage apparatus 30 (the memory 121 of the archive storage apparatus 120), a data mover program 37 (125), a file system 36 (126), and a kernel/driver 38 (127) are stored. Further, a file sharing program 35 is stored in the memory 31 of the file storage apparatus 30. In the following explanation, the data mover program 37 in the file storage apparatus 30 is referred to as "local mover", the data mover program 125 in the archive storage apparatus 120 is referred to as "remote mover", and, when the data mover program 37 and the data mover program 125 are not specifically distinguished, the data mover programs 37 and 125 are referred to as "data mover program". A file is exchanged between the file storage apparatus 30 and the archive storage apparatus 120 via the local mover 37 and the remote mover 125.

The local mover 37 reads out a replication target file (actual data of the file and metadata of the file) from the LU 24 of the RAID system 20 and transfers the file to the archive storage apparatus 120. The remote mover 125 receives the replication target file from the file storage apparatus 30 and writes the file in the LU 114 of the RAID system 110.

The local mover 37 deletes, when a certain predetermined condition is satisfied, a replicated file (strictly, actual data of the file) in the LU 24 to thereby realize substantive migration of the replicated file. Thereafter, when the local mover 37 receives a read request from the client/host 40 for a stub (metadata) of the file, the actual data of which is deleted, the local mover 37 acquires a file (actual data of the file) linked to the stub via the remote mover 125 and transmits the acquired file to the client/host 40. Note that, in this embodiment, "stub" is an object (metadata) with which storage destination information (information indicating a link destination) of the file is associated. It is not seen from the client/host 40 whether the file is the stub.

The kernel/driver 38 (127) performs general control and control peculiar to the hardware, for example, performs schedule control of a plurality of programs (processes) operating on the file storage apparatus 30 (the archive storage apparatus 120) and handles interruption from the hardware.

The file sharing program 35 is a program for providing a file sharing service between the file storage apparatus 30 and the client/host 40 using a communication protocol such as a CIFS (Common Internet File System) or an NFS (Network File System).

An application 45, a file system 46, and a kernel/driver 47 are stored in the memory 41 of the client/host 40.

The application 45 is software (an application program) used by the client/host 40 according to a purpose of work. The file system 46 and the kernel/driver 47 are substantially the same as the file system 36 (126) and the kernel/driver 38 (127).

The file system 36 (126) is a file system program. The file system 36 (126) manages file system configuration information 200. The file system configuration information 200 includes information concerning respective files and directories (e.g., information representing sizes, locations, and the like of the files). The file system configuration information 200 is stored in, for example, the OS LU 25 (115) or the memory 31 (121).

Figure 4:
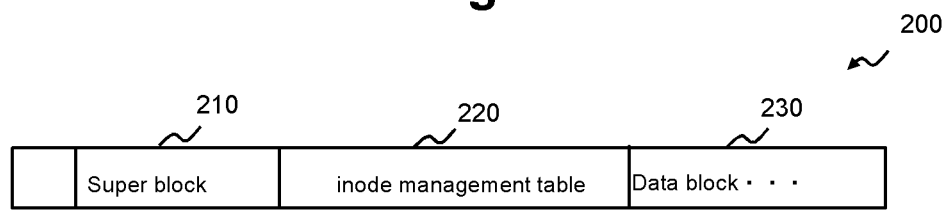
FIG. 4 is a configuration diagram of file system configuration information according to the first embodiment.

FIG. 4 is a configuration diagram of file system configuration information according to the first embodiment.

The file system configuration information 200 includes a super block 210, an inode management table 220, and a data block group 230. The super block 210 is a block that collectively retains information concerning the file system. The super block 210 stores information such as the size of the file system and a free space of the file system for example. The inode management table 220 is a table for managing an inode, which is an example of file management information. In the file system 36 (126), one inode is associated with one of directories and files. An inode corresponding to a directory is referred to as directory entry. It is possible to access an inode corresponding to a file by tracing a file path using a plurality of directory entries.

Figure 5:
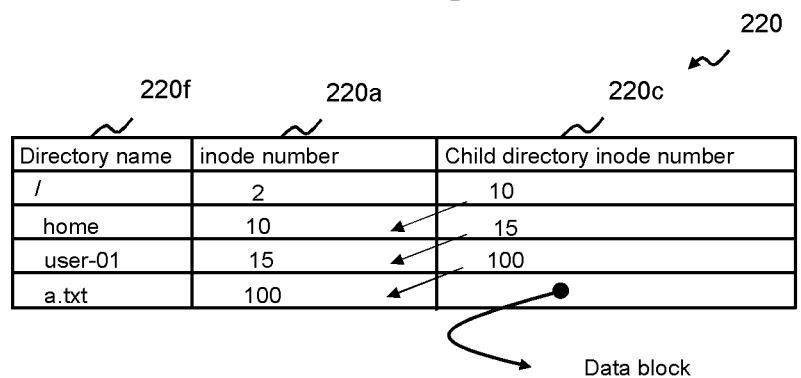
FIG. 5 is a configuration diagram of a directory entry according to the first embodiment.

FIG. 5 is a configuration diagram of the directory entry according to the first embodiment. FIG. 5 shows a directory entry of the inode management table 220 used in accessing a file indicated by "/home/use-01/a.txt".

In accessing the file indicated by "/home/use-01/a.txt", the file system traces inodes corresponding to inode numbers "2", "10", and "15" and specifies an inode of an inode number "100" corresponding to the file. Then, the file system specifies a data block, in which actual data of the file is stored, on the basis of the inode of the inode number "100" corresponding to the file and accesses the data block.

Figure 6:
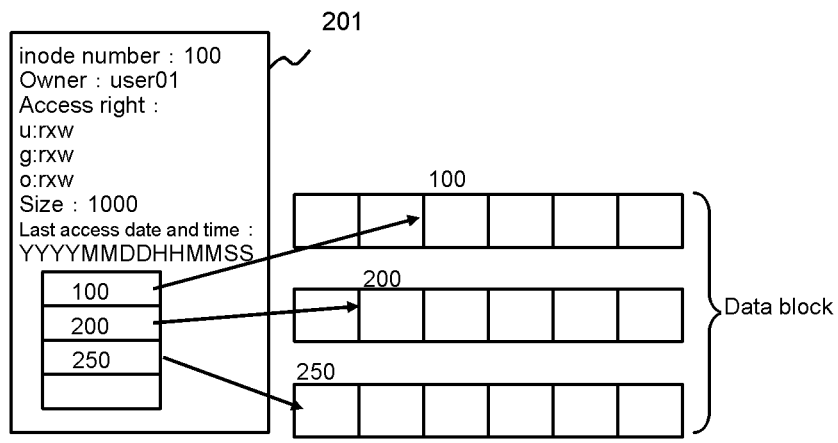
FIG. 6 is a configuration diagram of an inode according to the first embodiment.

FIG. 6 is a configuration diagram of an inode corresponding to a file according to the first embodiment.

An inode 201 corresponding to a file includes a plurality of metadata. As types of the metadata, there are an owner of the file, an access right to the file, a file size, storage locations (data block addresses 1, 2, 3, etc.) of the file. For example, according to a row including the inode number "100" (the inode of the inode number "100"), as shown in FIG. 6, it is seen that the file includes data (actual data) stored by data blocks (data blocks in a LU) described below.

Data in a predetermined number of (two) continuous data blocks starting from a data block of an address 100.

Data in a predetermined number of (two) continuous data blocks starting from a data block of an address 200.

Data in a predetermined number of (two) continuous data blocks starting from a data block of an address 250.

Next, a detailed configuration of the inode management table is explained.

Figure 7:
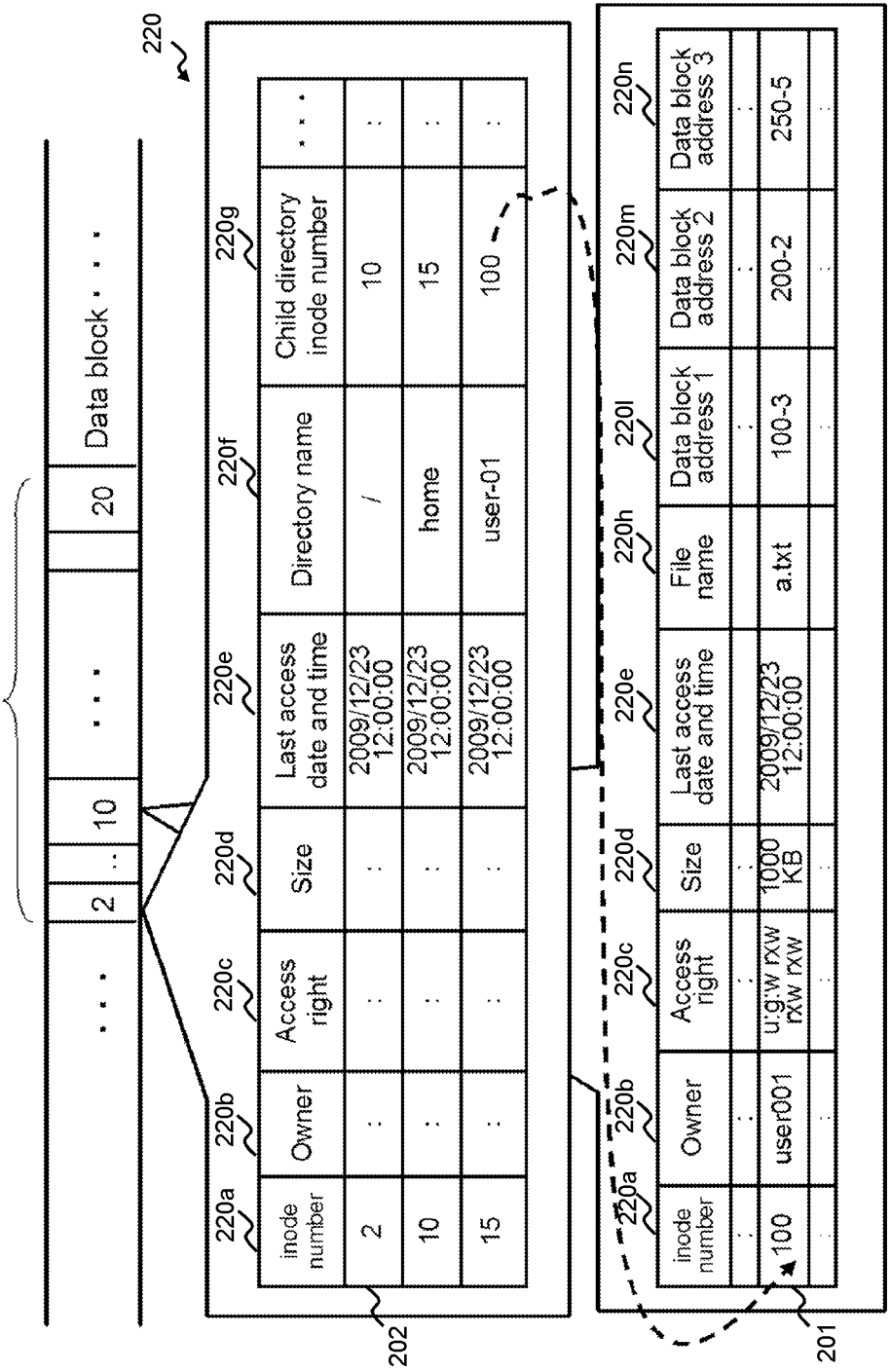
FIG. 7 is a configuration diagram of an inode management table according to the first embodiment.

FIG. 7 is a configuration diagram of the inode management table according to the first embodiment.

The inode management information table 220 manages two kinds of entries, i.e., an inode 202 corresponding to a directory and an inode 201 corresponding to a file.

The inode 202 corresponding to a directory includes fields of an inode number 220a, an owner 220b, an access right 220c, a size 220d, a last access date and time 220e, a directory name 220f, and a child directory inode number 220g.

In the inode number 220a, an inode number corresponding to this entry is stored. In the owner 220b, identification information of an owner of a directory corresponding to this entry is stored. In the access right 220c, an access right to the directory corresponding to this entry is stored. In the size 220d, a size of the directory corresponding to this entry is stored. In the last access date and time 220e, a last access date and time to the directory corresponding to this entry is stored. In the directory name 220f, a name (a directory name) of the directory corresponding to this entry is stored. In the child directory inode number 220g, an inode number corresponding to a directory (a file) that is a child of (immediately under) the directory corresponding to this entry is stored.

The inode 201 corresponding to a file includes fields of an inode number 220a, an owner 220b, an access right 220c, a size 220d, a last access date and time 220e, a file name 220h, a data block address 1 220l, a data block address 2 220m, and a data block address 3 220n. Note that, concerning fields indicated by reference symbols same as those of the inode 202 corresponding to a directory, the same information is stored. In the file name 220h, a file name of a file corresponding to this entry is stored. In the data block address 1 220l, the data block address 2 220m, and the data block address 3 220n, addresses of data blocks in which actual data of the file corresponding to this entry are stored are stored.

In this embodiment, new types of metadata are managed in the inode management table 220.

Figure 8:
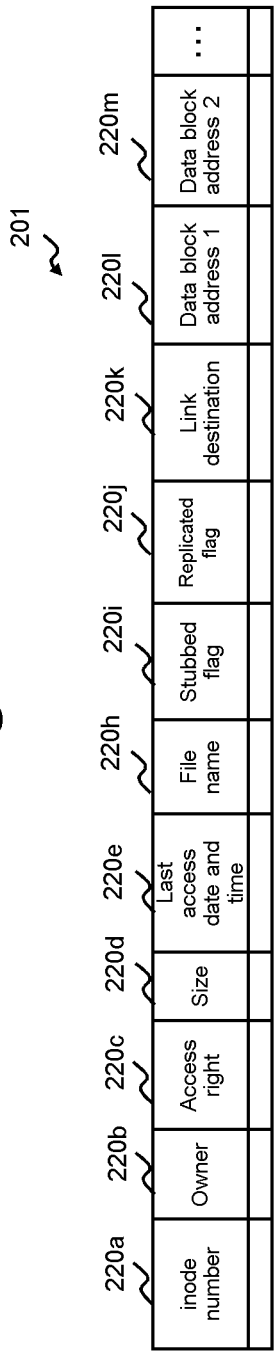
FIG. 8 is a detailed configuration diagram of the inode according to the first embodiment.

FIG. 8 is a detailed configuration diagram of the inode management table according to the first embodiment.

The inode 201 corresponding to a file further includes fields of a stubbed flag 220*i*, a replicated flag 220*j*, and a link destination 220*k*.

In the stubbed flag 220*i*, a stubbed flag representing whether a file corresponding to this entry (referred to as target file in the explanation with reference to FIG. 8) is stubbed is stored. For example, when the target file is stubbed, the stubbed flag is "ON". When the target file is not stubbed, the stubbed flag is "OFF".

In the replicated flag 220*j*, a replicated flag representing whether the target file is replicated is stored. When the target file is replicated, the replicated flag is "ON". When the target file is not replicated, the replicated flag is "OFF".

In the link destination 220*k*, information (e.g., a URL (Uniform Resource Locator)) representing a storage destination (a link destination) of actual data of the target file in the Core 100 is stored.

In this embodiment, a user management table 240 for session connection management is used in order to manage a user connectable to the file storage apparatus 30 and manage a session-connecting user. The user management table 240 for session connection management is stored in, for example, the memory 31 of the file storage apparatus 30. A user management table for session disconnection management having the same configuration is used in order to manage a session-disconnecting user. The user management table for session disconnection management is also stored in the memory 31.

Figure 9:
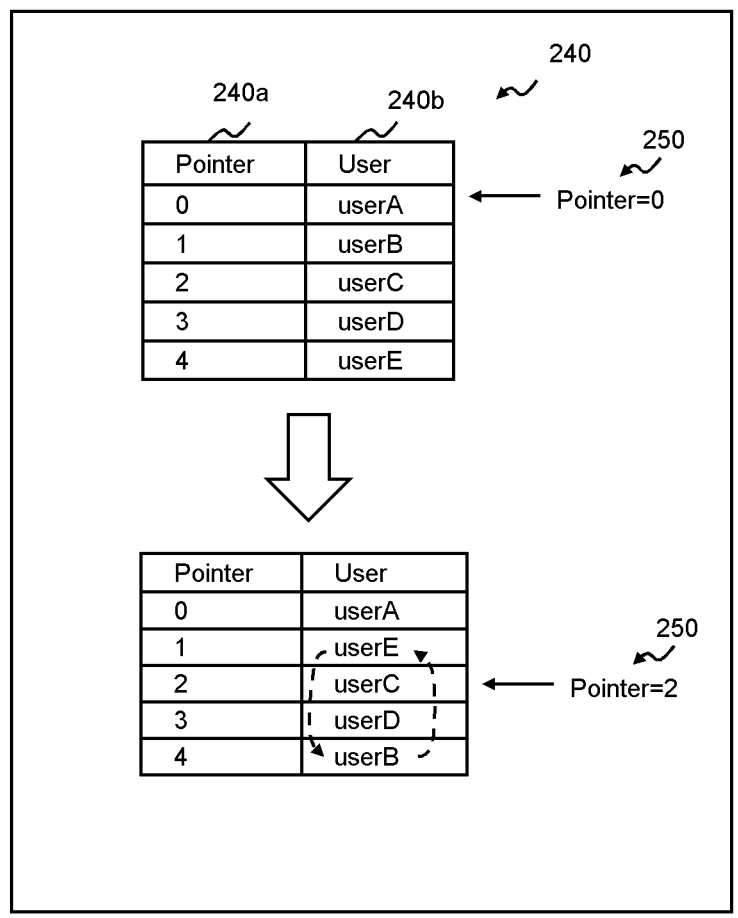
FIG. 9 is a diagram illustrating a user management table and a method of managing the user management table according to the first embodiment.

FIG. 9 is a diagram illustrating the user management table and a method of managing the user management table according to the first embodiment. FIG. 9 is the user management table 240 for session connection management for managing a session-connecting user. However, the user management table for session disconnection management for managing a session-disconnecting user has the same configuration. For the configuration of the user management table for session disconnection management and a method of managing the user management table for session disconnection management, the session-connecting user in FIG. 9 only has to be read as the session-disconnecting user.

The user management table 240 for session connection management stores, as shown in the upper figure of FIG. 9, an entry including fields of a pointer 240*a* and a user 240*b*. In the pointer 240*a*, a number of an entry in the user management table 240 is stored. In the user 240*b*, a user name (user identification information with which a user can be identified such as a user ID) of a user corresponding to the entry is stored.

In this embodiment, as shown in the lower figure of FIG. 9, according to whether an entry is an entry corresponding to a number indicated by a pointer 250 for connection management or an entry after the entry, it is managed whether a user corresponding to the entry is a user who has performed session connection at or after a predetermined point. This means that a user corresponding to an entry before the entry indicated by the pointer for connection management is a user who has performed session connection at or after the predetermined point and a user corresponding to the entry indicated by the pointer or an entry after the entry is a user who has not performed session connection at or after the predetermined point. The pointer 250 for connection management is stored in, for example, the memory 31.

The management of the session-connecting user performed using the user management table 240 for session connection management is performed as explained below. First, when a user performs session connection, it is determined whether an entry in which a user name of the user is stored is an entry indicated by the pointer or an entry after the entry. If the entry is the entry indicated by the pointer or an entry after the entry, a user name of the entry and a user name of the entry indicated by the pointer are swapped. The pointer 250 is incremented by one. Consequently, it is possible to collect entries including user names of users who perform session connection at or after the predetermined point.

For example, in a state shown in the upper figure of FIG. 9 and when nobody is performing session connection, if a user A and a user E perform session connection, since the pointer has an initial value 0, concerning the user A, an entry is an entry indicated by the pointer or an entry after the entry. Therefore, the user name is swapped with a user name in the position of the pointer. However, since the user is in the position of the pointer, the user name is not moved and the pointer changes to 1. Next, concerning the User E, an entry is the entry indicated by the pointer or an entry after the entry. Therefore, as shown in the lower figure of FIG. 9, the User B, which is a user name in the position of the pointer, and the user E are swapped. The User E is stored in the second entry and 1 is added to the pointer to set the pointer to 2. Therefore, user names of session-connecting users, i.e., the User A and the User E are collected and managed in an entry before an entry indicated by the pointer.

Next, processing performed in the first embodiment is explained.

Figure 10:
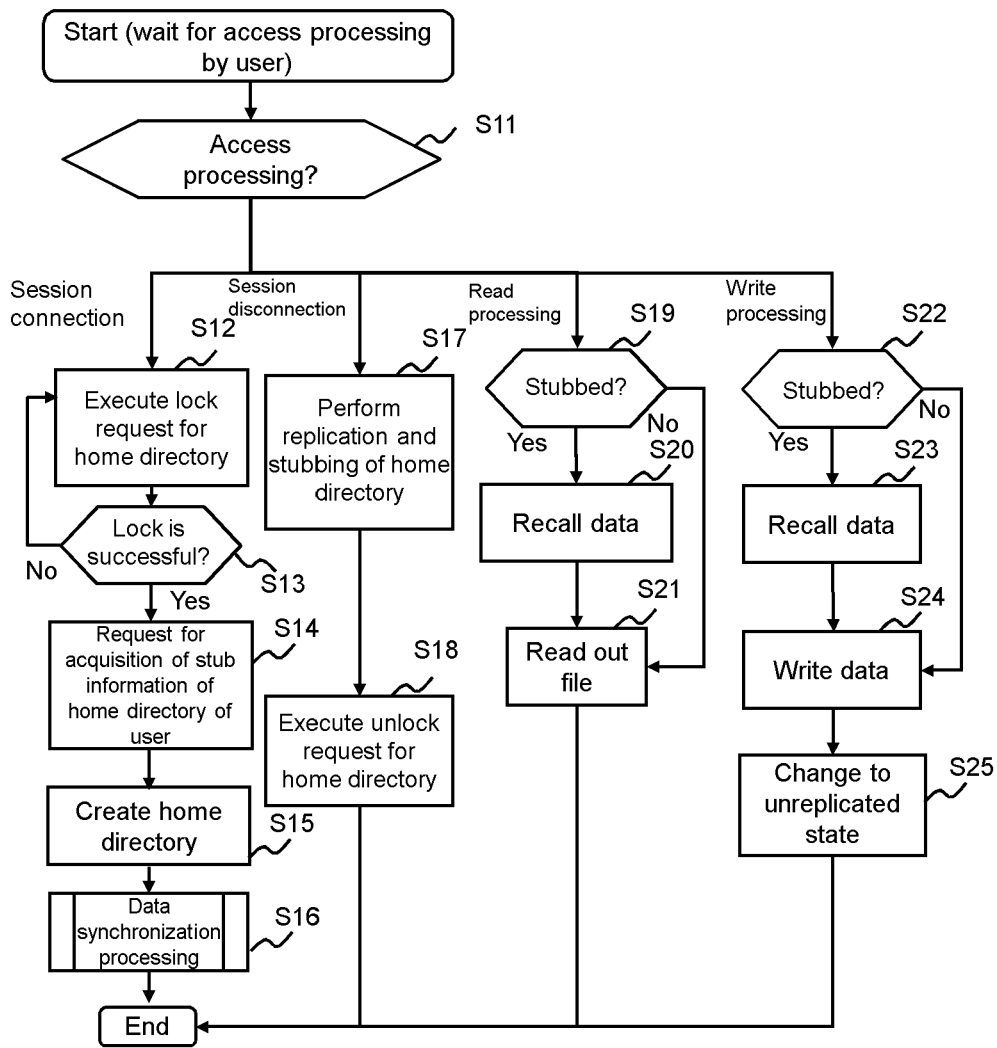
FIG. 10 is a flowchart of an access processing according to the first embodiment.

FIG. 10 is a flowchart of an access processing according to the first embodiment. The access processing is executed when access processing by a user is sent from the client/host 40 to the file storage apparatus 30.

Upon receiving the access processing, the file storage apparatus 30 determines what is a type of the access processing (step S11).

When determining in step S11 that the type of the access processing is session connection to the file storage apparatus 30 (step S11: session connection), the file storage apparatus 30 executes a lock request for a home directory of a user who request the access processing (step S12). Processing executed according to the lock request is explained below with reference to FIG. 11.

The file storage apparatus 30 determines whether lock is successful (step S13). As a result of the determination, when the lock is not successful (step S13: No), the file storage apparatus 30 advances the processing to step S12.

On the other hand, when the lock is successful (step S13: Yes), the file storage device 30 performs an acquisition request for stub information corresponding to a directory and a file subordinate to the home directory of the user (step S14). The stub information is an inode (inodes) (an entry, entries) managed in the file system 126 of the archive storage device 120. Processing executed according to the acquisition request for the stub information is explained below with reference to FIG. 16.

Thereafter, the file storage apparatus 30 creates a home directory on the basis of the acquired stub information (step S15), executes data synchronization processing (see FIGS. 13 and 14) (step S16), and ends the access processing.

When determining in step S11 that the type of the access processing is session disconnection from the file storage apparatus 30 (step S11: session disconnection), the file storage apparatus 30 performs processing during session disconnection (step S17). For example, the file storage apparatus 30 performs processing such as replication and stubbing of the home directory of the user who requests the access processing. The processing during session disconnection is explained below with reference to FIGS. 17 through 19.

Next, the file storage apparatus 30 executes an unlock request for the home directory (step S18). Processing executed according to the unlock request is explained below with reference to FIG. 12. Thereafter, the file storage apparatus 30 ends the access processing.

When determining in step S11 that the type of the access processing is Read processing for a file (step S11: Read processing), the file storage apparatus 30 refers to an inode (an entry) of the inode management table 220 of the file system 36 corresponding to a Read target file and determines whether the file is stubbed (step S19). It is possible to determine, by referring to the stubbed flag 220i of the inode 201, whether a file is stubbed. As a result of the determination, when the file is stubbed (step S19: Yes), the file storage apparatus 30 executes processing for recalling actual data of the file (step S20) and advances the processing to step S21. According to the processing for recalling the file, the actual data of the file is stored in a data block of the LU 24. A block address in which the actual data is stored is stored in a data block address of the inode 201 of the inode management table 220 corresponding to the file. Note that the recall processing for recalling the actual data of the file is explained below with reference to FIG. 15.

On the other hand, when the file is not stubbed (step S19: No), i.e., when the actual data of the file is stored in the LU 24, the file storage apparatus 30 advances the processing to step S21.

In step S21, the file storage apparatus 30 reads out an entity of the file on the basis of the inode 201 of the file. In other words, the file storage apparatus 30 specifies, from the inode 201, a data block in which the actual data is stored and reads out data from the data block. Thereafter, the file storage apparatus 30 ends the access processing.

When determining in step S11 that the type of the access processing is Write processing for a file (step S11: Write processing), the file storage apparatus 30 refers to the inode (the entry) 201 of the inode management table 220 of the file system 36 corresponding to a Write target file and determines whether the file is stubbed (step S22). As a result of the determination, when the file is stubbed (step S22: Yes), the file storage apparatus 30 executes processing for recalling actual data of the file (step S23) and advances the processing to step S24. According to the processing for recalling the file, the actual data of the file is stored in a data block of the LU 24 and a block address in which the actual data is stored is stored in a data block address of the inode 201 of the inode management table 240 corresponding to the file. The processing for recalling the actual data of the file is explained below with reference to FIG. 15.

On the other hand, when the file is not stubbed (step S22: No), the file storage apparatus 30 advances the processing to step S24.

In step S24, the file storage apparatus 30 writes the actual data of the file on the basis of the inode 201 of the file. In other words, the file storage apparatus 30 specifies, from the inode 201, a data block in which the actual data is stored and writes the actual data in the data block. Thereafter, the file storage apparatus 30 changes a replicated flag of the replicated flag 220j of the inode 201 of the file to a replicated flag ("OFF") indicating that the file is not replicated (step S25) and ends the access processing.

Figure 11:
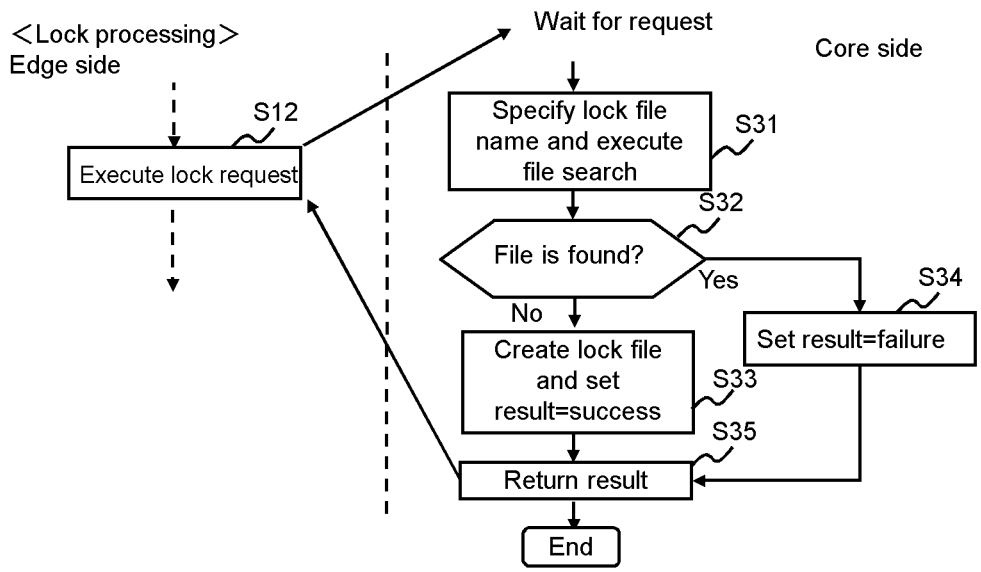
FIG. 11 is a flowchart of a lock processing according to the first embodiment.

FIG. 11 is a flowchart of a lock processing according to the first embodiment.

The lock processing is executed when the lock request is executed by the file storage apparatus 30 in step S12 shown in FIG. 10.

Upon receiving the lock request, the archive storage apparatus 120 of the Core 100 specifies, from an Edge name and a lock target home directory name included in the lock request, a name of a lock file (a lock file name) for managing lock of the home directory and searches for a lock file for managing the lock of the same home directory, i.e., a lock file including the same home directory name (step S31). The lock file is a file created on the CORE 100 side in order to identify presence or absence of a lock state. When a home directory is locked, a lock file concerning the home directory is created. When a home directory is unlocked, a lock file concerning the home directory is deleted. By using a lock request source (identification information of an Edge) and a home directory name as a file name, it is possible to learn, through a file search, who locks which resource. Note that the lock file name may include a name of a user who performs the lock request. The lock file is stored in, for example, the memory 121.

Subsequently, the archive storage apparatus 120 determines whether a lock file including the same home directory name is found (step S32). As a result of the determination, when a lock file including the same home directory name is found (step S32: Yes), this means that a home directory of the home directory name is locked. Therefore, the archive storage apparatus 120 sets a result of the lock request as failure (step S34), returns the result of the lock request to the file storage apparatus 30 of the Edge 10 (step S35), and ends the processing.

On the other hand, when a lock file including the same home directory name is not found (step S32: No), the archive storage apparatus 120 stores a lock file of the lock file name specified in step S31 in, for example, the memory 121, sets a result of the lock request as success (step S33), and returns the result of the lock request to the file storage apparatus 30 of the Edge 10 (step S35).

The file storage apparatus 30 that receives the result of the lock request returned in step S35 ends step S12 and advances the processing to the next step. According to the lock processing, it is possible to appropriately perform lock control with a home directory set as a unit.

Note that the lock processing may be performed during first access to the file rather than during session connection.

Figure 12:
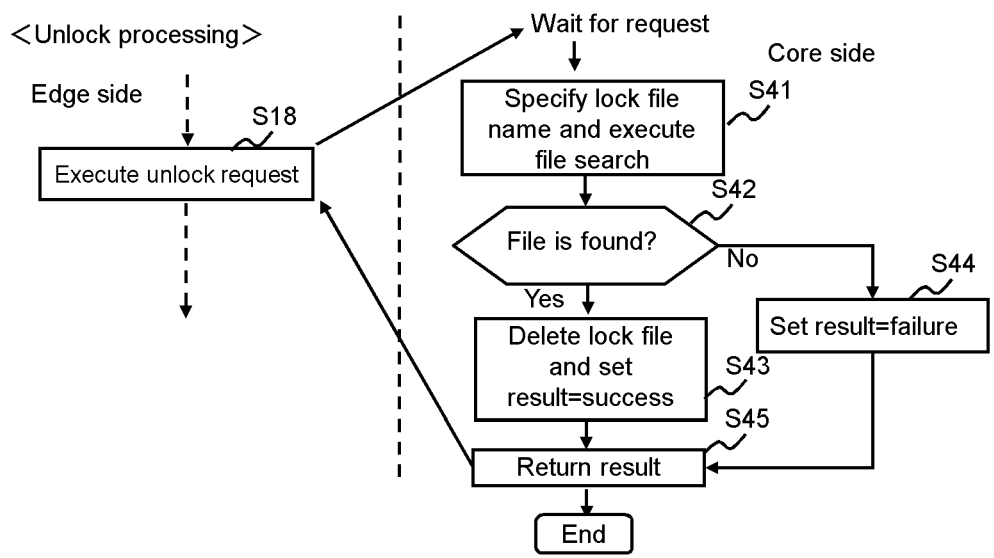
FIG. 12 is a flowchart of an unlock processing according to the first embodiment.

FIG. 12 is a flowchart of an unlock processing according to the first embodiment.

The unlock processing is executed when the unlock request is executed by the file storage apparatus 30 in step S18 shown in FIG. 10.

Upon receiving the unlock request, the archive storage apparatus 120 of the Core 100 specifies, from an Edge name and a lock target home directory name included in the unlock request, a name (a lock file name) of a lock file for managing lock of the home directory and searches for a lock file of the lock file name (step S41).

Subsequently, the archive storage apparatus 120 determines whether a lock file of the lock file name is found (step S42). As a result of the determination, when a lock file of the lock file name is found (step S42: Yes), the archive storage apparatus 120 deletes the lock file, sets a result of the unlock request as success (step S43), returns the result of the unlock request to the file storage apparatus 30 of the Edge 10 (step S45), and ends the processing.

On the other hand, when a lock file of the lock file name is not found (step S42: No), the archive storage apparatus 120 sets a result of the unlock request as failure (step S44)

and returns the result of the unlock request to the file storage apparatus 30 of the Edge 10 (step S45).

The file storage device that receives the result of the unlock request returned in step S45 ends step S18 and advances the processing to the next step. According to the unlock processing, it is possible to appropriately perform lock control with a home directory set as a unit.

Note that the unlock processing may be performed when there is no access (read or write) to a file for a predetermined time or more after replication rather than during session disconnection.

Figure 13:
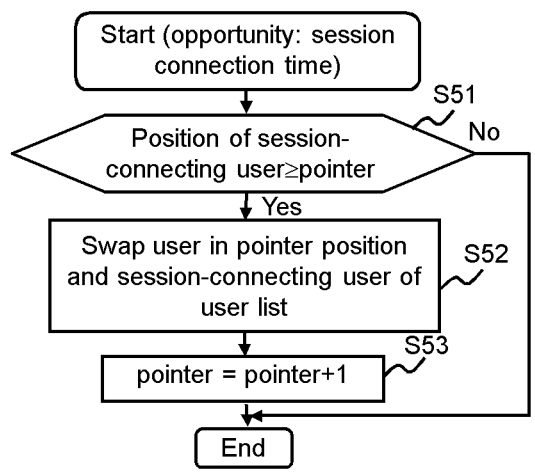
FIG. 13 is a flowchart of a connecting user management processing according to the first embodiment.

FIG. 13 is a flowchart of a connecting user management processing according to the first embodiment.

The connecting user management processing corresponds to processing of a part of the data synchronization processing in step S16 shown in FIG. 10.

First, the file storage apparatus 30 determines whether a value (an order of an entry) in the position of a user name of a session-connecting user in the user management table 240 for session connection management is equal to or larger than a value of the pointer for connection management.

As a result of the determination, when the value in the position of the user name of the session-connecting user is equal to or larger than the value of the pointer (step S51: Yes), the file storage apparatus 30 swaps (exchanges) a user name of an entry in the user management table 240 indicated by the value of the pointer and a user name of an entry in which the user name of the session-connecting user is stored (step S52), adds 1 to the value of the pointer (step S53), and ends the processing.

On the other hand, when the value in the position of the user name of the session-connecting user is smaller than the value of the pointer (step S51: No), the file storage apparatus 30 ends the processing.

According to the processing, it is possible to collect and manage the user names of session-connecting users in entries of the user management table 240 before the entry indicated by the pointer.

Figure 14:
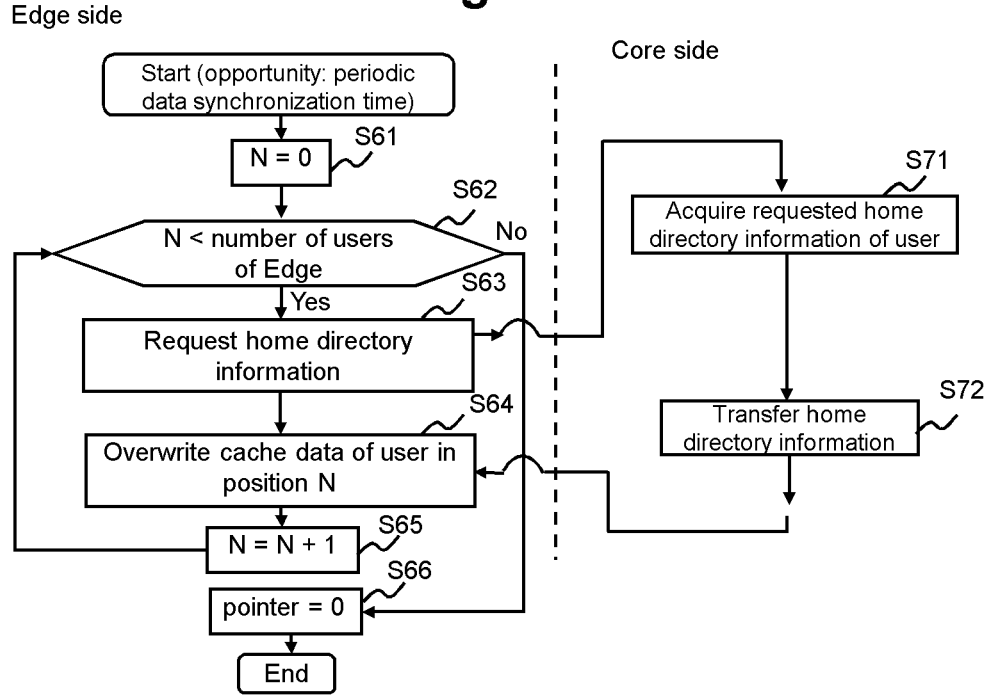
FIG. 14 is a flowchart of a cache overwrite processing according to the first embodiment.

FIG. 14 is a flowchart of a cache overwrite processing according to the first embodiment.

The cache overwrite processing corresponds to processing of a part of the data synchronization processing in step S16 shown in FIG. 10. The cache overwrite processing is executed, for example, in every predetermined time. Note that the cache overwrite processing may be executed immediately after the end of the connecting user management processing.

The file storage apparatus 30 sets a variable N to 0 (step S61) and determines whether the variable N is smaller than the number of users connectable to the file storage apparatus 30 of the Edge 10 (step S62). As a result of the determination, when the variable N is smaller than the number of users connectable to the file storage apparatus 30 of the Edge 10 (step S62: Yes), the file storage apparatus 30 requests home directory information of a user corresponding to a user name in the position of the variable N of the user management table 240 to the archive storage apparatus 120 (step S63) and advances the processing to step S64. The home directory information is information including inodes of a file and f a directory subordinate to a home directory of the user. The request for the home directory information includes, for example, a name of the home directory of the user.

On the other hand, upon receiving the request for the home directory information, the archive storage apparatus 120 acquires the request target home directory information of the user from the memory 121 (step S71) and transfers the acquired home directory information to the file storage apparatus 30 (step S72).

The file storage apparatus 30 acquires the home directory information transferred from the archive storage apparatus 120, configures a home directory, and overwrites, on the basis of the home directory information, data cached in the memory 31, for example, a inode (inodes) of a directory and a file of the home directory of the user (step S64).

Subsequently, the file storage apparatus 30 adds 1 to the variable N (step S65) and advances the processing to step S62.

On the other hand, when the variable N is not smaller than the number of users connectable to the file storage apparatus 30 of the Edge 10 (step S62: No), this means that cached data of all the users connectable to the file storage apparatus 30 are overwritten. Therefore, the file storage apparatus 30 sets the pointer to 0, resets a user who has performed connection (step S66), and ends the processing.

According to the connecting user management processing shown in FIG. 13, user names of users who perform session connection at a predetermined point or later are managed in order from the top of the user management table 240. Therefore, in the cache overwrite processing shown in FIG. 14, a cache of a session-connecting user is preferentially overwritten. In other words, for example, it is possible to appropriately prevent overwrite processing of data of a session-connecting user from being delayed by overwriting a file of a large size stored by a disconnecting user. Note that, as the session-connecting user, for example, a user moving from another Edge 10 is included.

Figure 15:
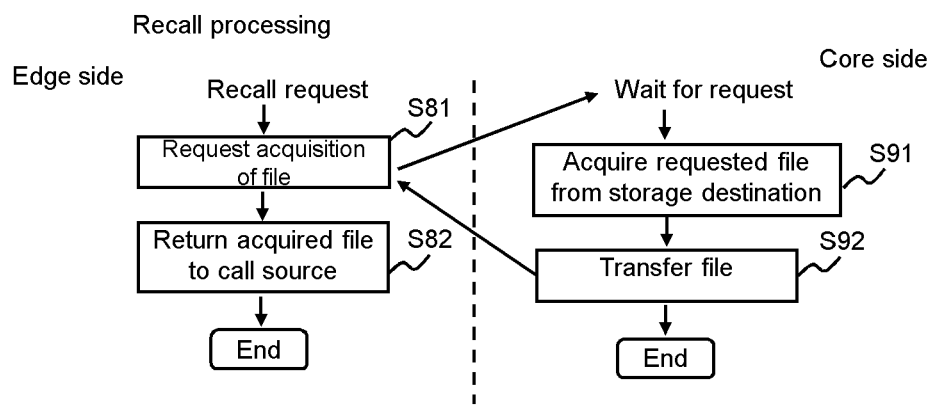
FIG. 15 is a flowchart of a recall processing according to the first embodiment.

FIG. 15 is a flowchart of a recall processing according to the first embodiment.

The recall processing is executed according to the processing by the file storage apparatus 30 in step S20 or S23 shown in FIG. 10.

The file storage apparatus 30 transmits an acquisition request (a file acquisition request) for actual data of a stubbed file to the archive storage apparatus 120 of the Core 100 (step S81). The file acquisition request includes information concerning a storage destination (a link destination) in which the acquisition target actual data is stored. The link destination can be acquired from the link destination 220k of the inode 201 of the stubbed file.

Upon receiving the file acquisition request, the archive storage apparatus 120 acquires, on the basis of the storage destination in the file acquisition request, the actual data of the acquisition target file from the corresponding storage destination (step S91), transfers the actual data of the file to the file storage apparatus 30 (step S92), and ends the processing.

Upon receiving the actual data of the file, the file storage apparatus 30 returns the actual data of the file to a call source of the acquired actual data of the file, i.e., the processing step in step S20 or S23 in FIG. 10 (step S82) and ends the recall processing. Note that in step S20 or S23 in FIG. 10, the returned actual data of the file is stored in a data block of the LU 24, and a block address in which the actual data is stored is stored in a data block address (2201, etc.) of the inode 201 of the inode management table 220 corresponding to the file and the "stubbed" flag 220i is set to OFF.

Figure 16:
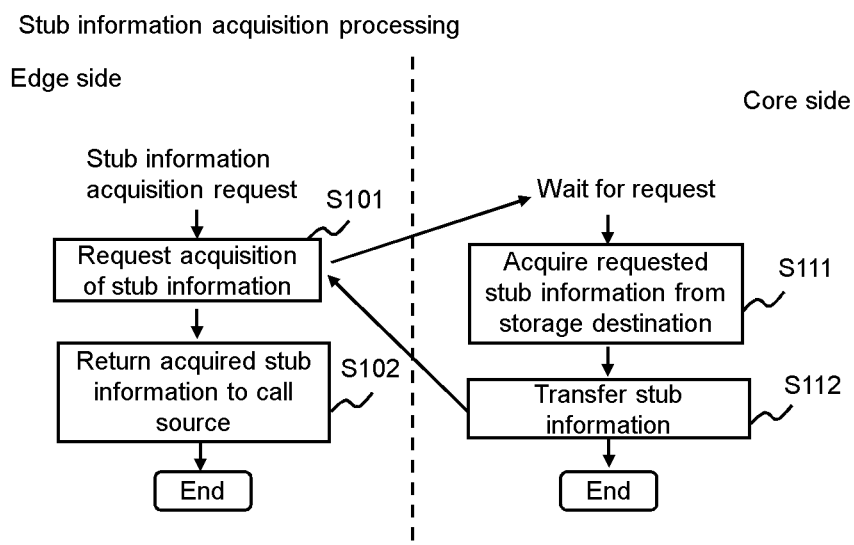
FIG. 16 is a flowchart of a stub information acquisition processing according to the first embodiment.

FIG. 16 is a flowchart of a stub information acquisition processing according to the first embodiment.

The stub information acquisition processing is executed when an acquisition request for stub information is executed by the file storage apparatus 30 in step S14 shown in FIG. 10.

The file storage apparatus 30 transmits an acquisition request for stub information (a stub information acquisition request) to the archive storage apparatus 120 of the Core 100 (step S101). The stub information acquisition request includes information (e.g., a home directory name) for specifying a target home directory for which stub information is acquired.

Upon receiving the stub information acquisition request, the archive storage apparatus 120 acquires, on the basis of the information for specifying the home directory, the inode 202 of all directories and the inode 201 of all files (stub information) subordinate to the home directory (step S111), transfers the inodes 201 and 202 to the file storage apparatus 30 (step S112), and ends the processing. In the replicated flag 220j of the inode 201 transferred to the file storage apparatus 30, ON indicating that the target file is replicated is set. In the link destination 220k of the inode 201, a link destination in which actual data is stored is stored.

Upon acquiring the inodes 201 and 202, the file storage apparatus 30 returns the inodes 201 and 202 to a call source of the acquired stub information acquisition request, i.e., the processing step in step S14 in FIG. 10 (step S102) and ends the stub information acquisition processing. Consequently, the file storage apparatus 30 receives the inodes 201 and 202 of the directories and the files subordinate to the home directory.

Note that the stub information acquisition processing may be executed, for example, periodically besides, for example, during session connection.

A rename processing for a file, an invalidation processing for a cached file, and the like described in (1) to (4) below may be executed before step S101 in the stub information acquisition processing is executed.

(1) The file storage apparatus 30 transmits an inode number, a file path name, and a last update date and time of a file managed by the file system 36 to the archive storage apparatus 120.

(2) The archive storage apparatus 120 refers to an inode number and a file path name of a file managed by the file system 126 and the inode number and the file path name transmitted from the file storage apparatus 30, and When the inode numbers are the same and the file path names are different, the archive storage apparatus 120 changes (renames) the file path name.

(3) The archive storage apparatus 120 refers to the inode number and a last update date of the file managed by the file system 126 and the inode number and the last update date and time transmitted from the file storage apparatus 30. When the inode numbers are the same and the last update date and time transmitted from the file storage apparatus 30 is earlier than the last update date and time of the archive storage apparatus 120, i.e., when the file of the file storage apparatus 30 is old data, the archive storage apparatus 120 transmits the inode number to the file storage apparatus 30.

(4) The file storage apparatus 30 deletes actual data of a file corresponding to the inode number transmitted from the archive storage apparatus 120 to stub the file.

Figure 17:
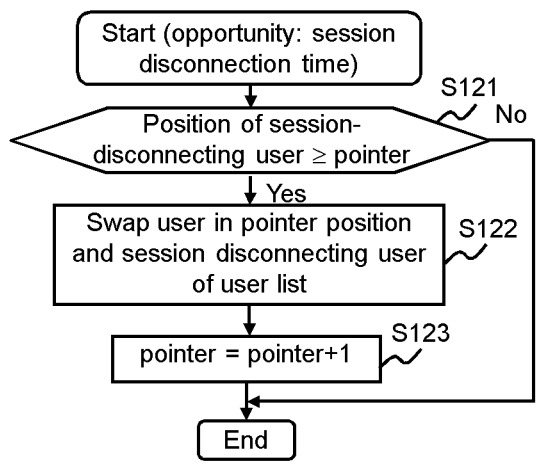
FIG. 17 is a flowchart of a disconnecting user management processing according to the first embodiment.

FIG. 17 is a flowchart of a disconnecting user management processing according to the first embodiment.

The disconnecting user management processing is processing of a part of the processing during the session disconnection executed in step S17 shown in FIG. 10.

First, the file storage apparatus 30 determines whether a value (an order of an entry) in the position of a user name of a session-disconnecting user in the user management table for session disconnection management is equal to or larger than a value of the pointer for disconnection management. The pointer for disconnection management is stored in, for example, the memory 31.

As a result the determination, when the value in the position of the user name of the session-disconnecting user is equal to or larger than the value of the pointer (step S121: Yes), the file storage apparatus 30 swaps (exchanges) a user name of an entry indicated by the value of the pointer and a user name of an entry in which the user name of the session-disconnecting user is stored in the user management table 240 (step S122), adds 1 to the value of the pointer (step S123), and ends the processing.

On the other hand, when the value in the position of the user name of the session-disconnecting user is smaller than the value of the pointer (step S121: No), the file storage apparatus 30 ends the processing.

According to the processing, it is possible to collect and manages the user names of session-disconnecting users in entries before the entry indicated by the pointer for disconnection management of the user management table for session disconnection management. In other words, it is possible to arrange users who perform session disconnection in a predetermined period in order from a user who performs session disconnection at earliest time.

Figure 18:
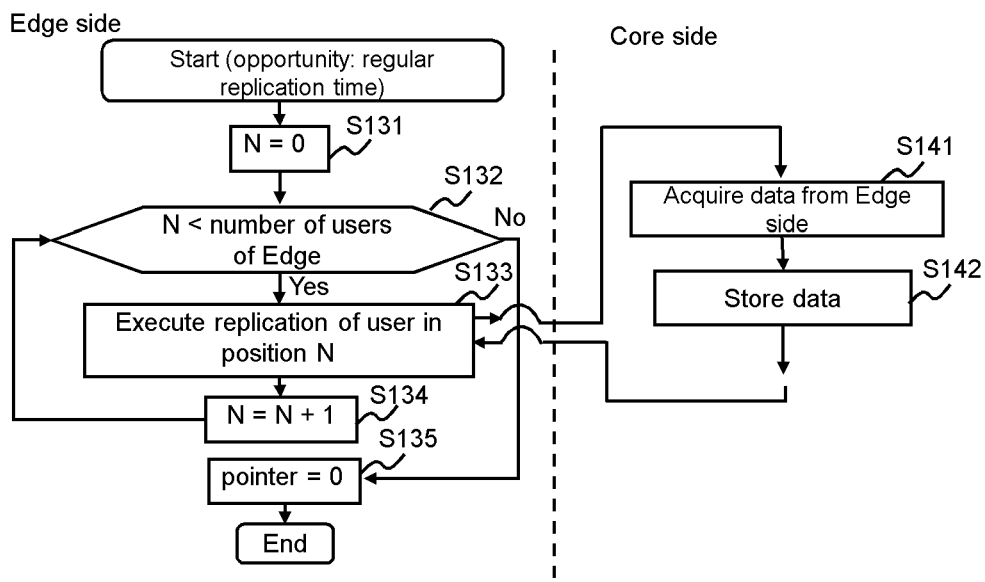
FIG. 18 is a flowchart of a replication processing (a method A) according to the first embodiment.

FIG. 18 is a flowchart of a replication processing (a method A) according to the first embodiment.

The replication processing (the method A) is processing of a part of the processing during the session disconnection executed in step S17 shown in FIG. 10 and is processing confirming to the method A executed together with the disconnecting user management processing shown in FIG. 17. The replication processing (the method A) is executed, for example, in every predetermined time or in a predetermined period of time. Further, an amount of data transmitted in one replication may be limited.

The file storage apparatus 30 sets a variable N to 0 (step S131) and determines whether the variable N is smaller than the number of users connectable to the file storage apparatus 30 of the Edge 10 (step S132). As a result of the determination, when the variable N is smaller than the number of users connectable to the file storage apparatus 30 of the Edge 10 (step S132: Yes), the file storage apparatus 30 executes replication of a file belonging to subordinate to a home directory of a user corresponding to a user name in the position of the variable N of the user management table 240 (step S133). Specifically, the file storage apparatus 30 transmits, to the archive storage apparatus 120, the inode (the inode in which a replicated flag of the replicated flag 220j is OFF) 201 corresponding to a file for which replication is necessary among files subordinate to the home directory of the user and actual data of the file.

On the other hand, the archive storage apparatus 120 acquires the inode of the file transmitted from the file storage apparatus 30 and acquires the actual data of the file (step S141). Subsequently, the archive storage apparatus 120 stores the acquired inode and the acquired actual data of the file in the inode management table 220 of the file system 126, stores a file entity in the LU 114, and stores, in the link destination 220k of the acquired inode, a URL indicating a storage location where the file entity is stored (step S142). The archive storage apparatus 120 transmits, to the file storage apparatus 30, a notification to the effect that the storage of the data is finished and ends the processing. Since the URL indicating the storage location is stored in the link destination 220k of the inode 201, thereafter, any file storage apparatus 30 can appropriately recall the actual data of the file using the link destination 220k by acquiring the inode 201.

Upon receiving, from the archive storage apparatus 120, the notification to the effect that the storage of the data is finished, the file storage apparatus 30 sets ON indicating the file is replicated in the replicated flag 220*j* of the inode 201 corresponding to the replicated file, stores, in the link destination 220*k*, the URL indicating the storage location in which the archive storage apparatus 120 stores the actual data of the file, and adds 1 to the variable N (step S134) and advances the processing to step S132. Note that, concerning the URL indicating the storage location in which the archive storage apparatus 120 stores the actual data of the file, the file storage apparatus 30 may receive the URL from the archive storage apparatus 120 before step S133 or may receive, from the archive storage apparatus 120, the URL as the notification to the effect that the storage of the data is finished.

On the other hand, when the variable N is not smaller than the number of users connectable to the file storage apparatus 30 of the Edge (step S132: No), this means that the replication is executed for all un-replicated files subordinate to home directories of all the users connectable to the file storage devices 30. Therefore, the file storage apparatus 30 sets the pointer to 0, excludes all the users from disconnecting users (step S135), and ends the processing.

The user IDs of the session-disconnecting users are managed in order from the top of the user management table 240 by the connecting user management processing shown in FIG. 17. Therefore, in the processing shown in FIG. 18, a file of a session-disconnecting user is preferentially replicated. Specifically, among users whose files are not replicated, a file of the session-disconnecting user is replicated earlier than (in preference to) a file of a non-session-disconnecting user (a user in session connection or a user performing neither connection nor disconnection of a session). Further, according to processing shown in FIGS. 17 and 18, files of the users are replicated in order from a file of a user who disconnects a session at earliest time. Among the session-disconnecting users, the user who performs session disconnection at earlier time is considered to be a user highly likely to move to another Edge 10. Therefore, thereafter, when the user performs session connection in the other Edge 10, a file of a home directory of the user can be appropriately present in the Core 100. According to the processing explained above, for example, it is possible to appropriately prevent a situation in which data of a session-disconnecting user is not replicated within a fixed time by replicating a file having a large size stored by a connecting user. The data of the respective users may be replicated in arbitrary order, for example, order of priority orders of the respective users set arbitrarily rather than according to the connecting user management processing shown in FIG. 17.

Figure 19:
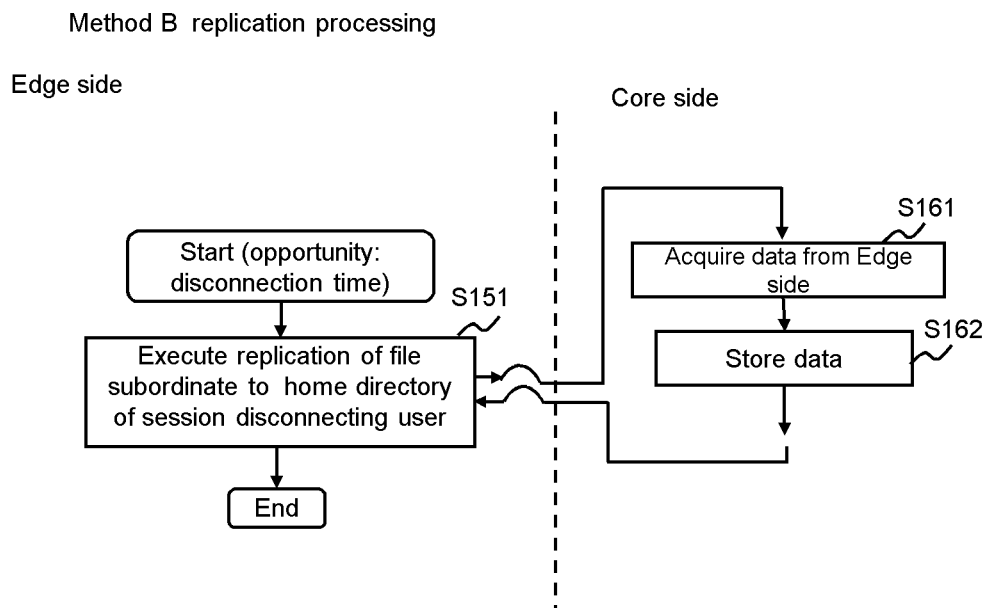
FIG. 19 is a flowchart of a replication processing (a method B) according to the first embodiment.

FIG. 19 is a flowchart of a replication processing (a method B) according to the first embodiment.

The replication processing (the method B) is another example of the processing of a part of the processing during session disconnection executed in step S17 shown in FIG. 10. The replication processing (the method B) is processing that may be executed instead of combined processing of the disconnecting user management processing shown in FIG. 17 and the replication processing (the method A) shown in FIG. 18. The replication processing (the method B) is executed, for example, during session disconnection.

The file storage apparatus 30 executes replication of a file belonging to subordinate to a home directory of a session-disconnecting user (step S151). Specifically, the file storage apparatus 30 transmits, to the archive storage apparatus 120, the inode (the inode in which a replicated flag of the replicated flag 220*j* is OFF) 201 corresponding to a file for which replication is necessary among files subordinate to the home directory of the user and actual data of the file.

On the other hand, the archive storage apparatus 120 acquires the inode of the file transmitted from the file storage apparatus 30 and acquires the actual data of the file (step S161). Subsequently, the archive storage apparatus 120 stores the acquired inode and the acquired actual data of the file in the inode management table 220 of the file system 126, stores a file entity in the LU 114 (step S162). The archive storage apparatus 120 transmits, to the file storage apparatus 30, a notification to the effect that the storage of the data is finished and ends the processing. Since a URL indicating a storage location is stored in the link destination 220*k* of the inode 201, thereafter, any file storage apparatus 30 can appropriately recall the actual data of the file using the link destination 220*k* by acquiring the inode 201.

Upon receiving, from the archive storage apparatus 120, the notification to the effect that the storage of the data is finished, the file storage apparatus 30 sets ON indicating the file is replicated in the replicated flag 220*j* of the inode 201 corresponding to the replicated file, stores, in the link destination 220*k*, the URL indicating the storage location in which the archive storage apparatus 120 stores the actual data of the file, ends step S151, and ends the replication processing (the method B). Note that, concerning the URL indicating the storage location in which the archive storage apparatus 120 stores the actual data of the file, the file storage apparatus 30 may receive the URL from the archive storage apparatus 120 before step S151 or may receive, from the archive storage apparatus 120, the URL as the notification to the effect that the storage of the data is finished.

According to the replication processing (the method B), it is possible to appropriately store, on the Core 100 side, a file subordinate to a home directory of a session-disconnecting user, i.e., a user who is likely to move to another Edge 10 and access a file.

Figure 20:
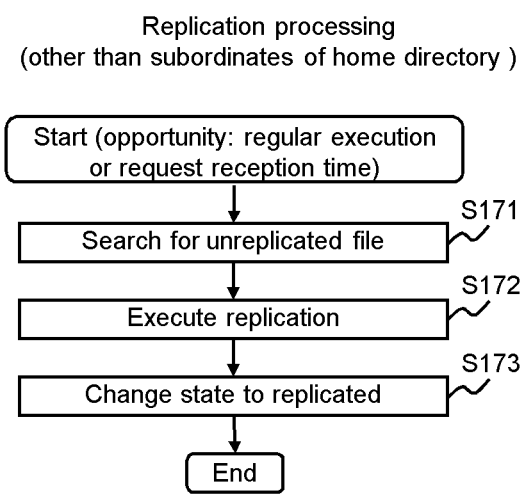
FIG. 20 is a flowchart of a replication processing (other than a subordinate) according to the first embodiment.

FIG. 20 is a flowchart of a replication processing (other than subordinate) according to the first embodiment.

The replication processing (other than subordinate) is processing for performing replication for a file other than a file subordinate to a home directory of a user. The replication processing (other than subordinate) is executed, for example, at every predetermined time or when a request is received from a user.

The file storage apparatus 30 searches for a file for which replication is necessary out of directories other than home directories of respective users (step S171). Subsequently, the file storage apparatus 30 executes replication of the file obtained by the search (step S172). Specifically, the file storage apparatus 30 transmits, to the archive storage apparatus 120, an inode (an inode in which a replicated flag of the replicated flag 220*j* is OFF) corresponding to the file for which replication is necessary among file of the directories other than the home directories of the users and transmits actual data of the file.

On the other hand, the archive storage apparatus 120 acquires the inode of the file transmitted from the file storage apparatus 30 and acquires the actual data of the file. Subsequently, the archive storage apparatus 120 stores the acquired inode and the acquired actual data of the file in the inode management table 220 of the file system 126, stores a file entity in the LU 114, transmits, to the file storage apparatus 30, a notification to the effect that the storage of the data is finished, and ends the processing.

Upon receiving, from the archive storage apparatus 120, the notification to the effect that the storage of the data is finished, the file storage apparatus 30 changes the replicated flag 220j of the inode corresponding to the replicated file to "Yes" indicating the file is replicated, sets ON indicating the file is replicated in the replicated flag 220j of the inode 201 corresponding to the replicated file, stores, in the link destination 220k, a URL indicating a storage location in which the archive storage apparatus 120 stores the actual data of the file (step S173), and ends the processing.

Figure 21:
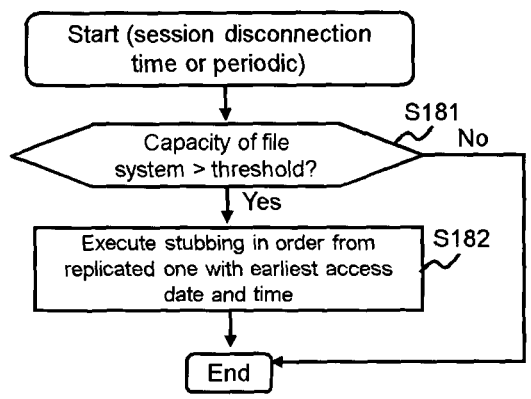
FIG. 21 is a flowchart of a stubbing processing according to the first embodiment.

FIG. 21 is a flowchart of a stubbing processing according to the first embodiment.

The stubbing processing is processing of a part of the processing during session disconnection executed in step S17 shown in FIG. 10. Note that the stubbing processing may be executed at every predetermined time.

The file storage apparatus 30 determines whether a capacity of the file system 36 is larger than a predetermined threshold (step S181). As a result of the determination, when the capacity of the file system 36 is larger than the predetermined threshold (step S181: Yes), this means that a free space of the LU 24 is small. Therefore, the file storage apparatus 30 executes stubbing in order from a file corresponding to the inode 201 in which a replicated flag of the replicated flag 220j indicates replicated and a last access date and time of the last access date and time 220e is the earliest (step S182). Specifically, the file storage apparatus 30 deletes actual data of a target file from a data block and sets, in the stubbed flag 220i, ON indicating that the file is stubbed. Consequently, it is possible to increase the free space of the LU 24.

Next, an information system according to a second embodiment is explained.

First, a problem is explained.

Figure 22:
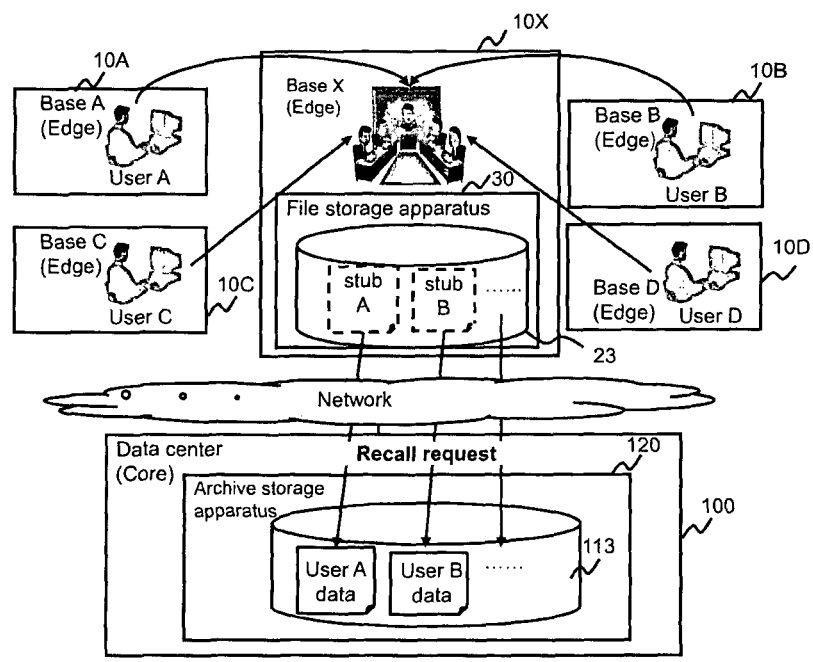
FIG. 22 is a diagram illustrating a problem.

FIG. 22 is a diagram illustrating the problem.

For example, it is assumed that a large conference is held in a base X (an Edge 10X), a large number of users gather in the base X from other bases, and the large number of users access files in the base X.

In this case, when a user performs connection to the file storage apparatus 30 in the base X using the client/host 40 and accesses a file, since only the inode 201 (stub information) is often stored in the file storage apparatus 30, the file storage apparatus 30 executes a recall request for acquiring actual data of the file to the archive storage apparatus 120. If the large number of users access files, a large number of recall requests are transmitted to the archive storage apparatus 120 and actual data of the files are transmitted as responses to the recall requests. As a result, a load on a network and a load on the archive storage apparatus 120 increase.

In the information system according to the second embodiment, the problem shown in FIG. 22 is solved by a realizing method 1 through a realizing method 3 explained below.

First, an overview of the realizing method 1 is explained. The realizing method 1 is a method of storing a file in advance in a base at a moving destination set by a user.

In an information system according to the realizing method 1 of the second embodiment, new components and new processing are added to a configuration same as the information system according to the first embodiment shown in FIGS. 2 and 3. Differences from the first embodiment are explained below.

In the information system according to the realizing method 1, the archive storage apparatus 120 stores a configuration file 131 anew.

Figure 23:
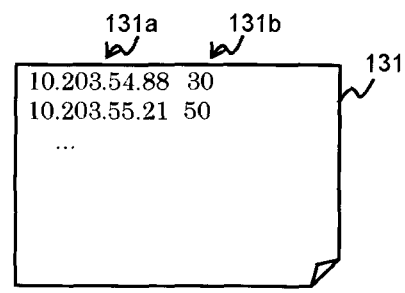
FIG. 23 is a configuration diagram of a configuration file according to a second embodiment.

FIG. 23 is a configuration diagram of a configuration file according to the second embodiment.

The configuration file 131 stores information concerning a base at a moving destination to where a user moves. The configuration file 131 is set in advance by, for example, a user using the client/host 40. The configuration file 131 includes moving destination base information 131a indicating a base (Edge) at a moving destination and time information 131b for specifying time in which the user uses the client/host 40 in the base at the moving destination. The moving destination base information 131a is, for example, an IP address of the file storage apparatus 30 at the moving destination base. The time information 131b is, for example, a moving time from a base at a moving origin where the user is present to the base at the moving destination. Note that the moving destination base information 131a and the time information 131b concerning a plurality of moving destinations may be set.

Figure 24:
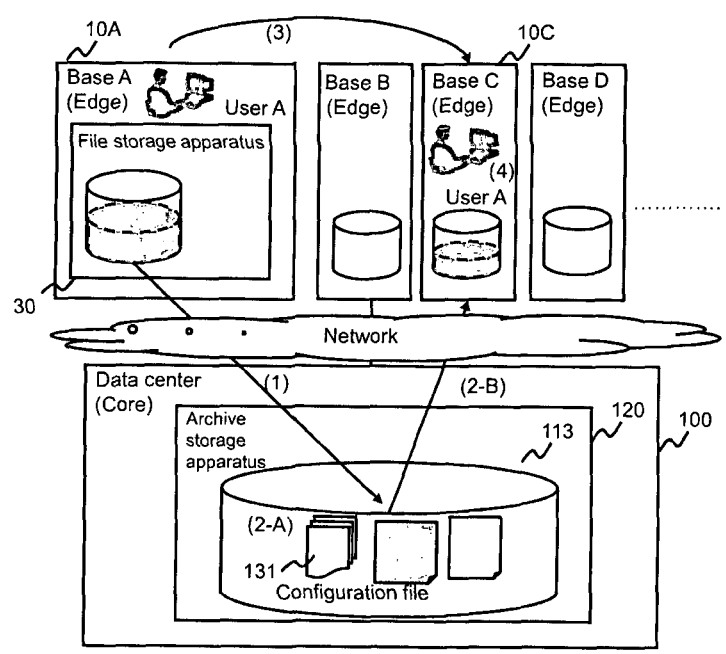
FIG. 24 is a diagram showing an overview of a realizing method 1 according to the second embodiment.

FIG. 24 is a diagram showing an overview of the realizing method 1 according to the second embodiment.

When the user works in the moving origin base (e.g., a base A) and performs session disconnection, replication of a file from the file storage apparatus 30 to the archive storage apparatus 120 is executed. A session disconnection request is transmitted to the archive storage apparatus 120 ((1) in FIG. 24).

The archive storage apparatus 120 refers to the configuration file 131 in a home director of the user who performs the session disconnection request and acquires moving destination base information ((2-A) in FIG. 24). In an example shown in FIG. 24, it is assumed that a moving destination is a base C.

Subsequently, the archive storage apparatus 120 transmits, to the file storage apparatus 30 in the base C at the moving destination, a file (including actual data) in the home directory of the user who performs the session disconnection request ((2-B) in FIG. 24).

Thereafter, the user moves from the base A at the moving origin to the base C at the moving destination ((3) in FIG. 24), performs session connection to the file storage apparatus 30 of the base C, and refers to a file. Then, since actual data of the file is already recalled to the base C, the user can quickly refer to the file ((4) in FIG. 24).

Next, an overview of the realizing method 2 is explained. The realizing method 2 is a method of specifying a base at a moving destination on the basis of a history of movements of users and storing a file in the base in advance.

In the information system according to the realizing method 2, the archive storage apparatus 120 stores a base list 132 anew. The base list 132 manages a history of movements of the users to respective bases.

Figures 25, 26:
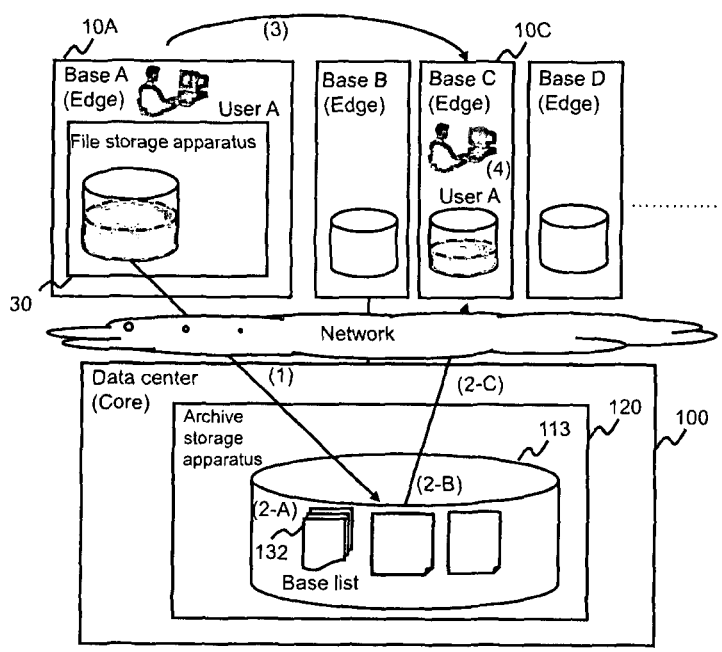
FIG. 25 is a configuration diagram of a base list according to the second embodiment.
FIG. 26 is a diagram showing an overview of a realizing method 2 according to the second embodiment.

FIG. 25 is a configuration diagram of a base list according to the second embodiment.

The base list 132 includes entries including fields of a user name 132a, a moving destination base 132b, a user IP 132c, a number of times of movement 132d, an average moving time 132e, and a data transfer rate 132f.

In the user name 132a, a user name is stored. In the moving destination base 132b, information for specifying a base at a moving destination (e.g., an IP address of the file storage apparatus 30 of the base) is stored. In the user IP 132c, an IP address (a user IP) of the file storage apparatus 30 of a base to which a user belongs is stored. In this embodiment, for example, it is assumed that the user belongs to any one of a plurality of bases. In the number of times of movement 132d, the number of times of movement from a base of a moving origin indicated by the user IP of the user IP 132c to a base at a moving destination indicated by the information of the moving destination base 132b is stored. In the average moving time 132e, an average of moving times (an average moving time) from the base at the moving origin indicated by the user IP of the user IP 132c to the base at the moving destination indicated by the information of the moving destination base 132b is stored. In the data transfer rate 132f, a rate in transferring data (a data transfer rate) to a base indicated by the IP address of the moving destination base 132b is stored.

FIG. 26 is a diagram showing an overview of the realizing method 2 according to the second embodiment.

When a user works in a moving origin base (e.g., the base A) and performs session disconnection, replication of a file from the file storage apparatus 30 to the archive storage apparatus 120 is executed. A session disconnection request is transmitted to the archive storage apparatus 120 ((1) in FIG. 26).

The archive storage apparatus 120 refers to the base list 132 and selects a base (assumed to be the base C) indicated by an IP address of the moving destination base 132b of an entry in which the number of times of movement of the number of times of movement 132d of the user who performs the session disconnection request is the largest ((2-A) in FIG. 26).

Subsequently, the archive storage apparatus 120 selects one or more files in order from a file having the latest last access date and time among files (including actual data) in a home directory of the user who performs the session disconnection request such that a transferred data amount of the one or more selected files satisfies Expression 1 below ((2-B) in FIG. 26).

transferred data amount<data transfer rate of the data transfer rate 132f of the base list 132×average moving time of the average moving time 132e of the base list 132   (Expression 1)

Subsequently, the archive storage apparatus 120 transmits the selected one or more files to the file storage apparatus 30 of the selected base (the base C) ((2-C) in FIG. 26).

Thereafter, when the user moves from the base A at the moving origin to the base C at the moving destination ((3) in FIG. 26), the user performs session connection to the file storage apparatus 30 of the base C and refers to a file. Then, since actual data of the one or more files are already recalled to the base C, the user can quickly refer to the file ((4) in FIG. 26).

According to the realizing method 2, a file is moved in advance to a base to which the user is highly likely to move. Therefore, it is highly likely that the user can quickly refer to a file in the base at the moving destination. According to the realizing method 2, the user does not have to perform setting of the configuration file 131 and the like in advance.

Next, an overview of the realizing method 3 is explained.

In the realizing method 2, a base at a moving destination is specified on the basis of the history of movements of the users and a file is stored in the base in advance. However, as a distribution of the numbers of times of movement to bases of the user, various cases are conceivable, for example, the movements of the users concentrate on a specific base and movements to respective bases are substantially equal. Therefore, when a file is simply stored in a specific base at a moving destination, it is likely that an undesirable case occurs.

Therefore, in the realizing method 3, tendencies concerning the movements to bases of users are analyzed on the basis of a history of the movements of the respective users and transfer of a file to the file storage apparatus 30 is controlled on the basis of the tendencies of the movements.

In order to determine the tendencies of the movements to the bases of the respective users, the respective bases are grouped on the basis of the numbers of times of movement of the users to the bases.

Figures 27, 28:
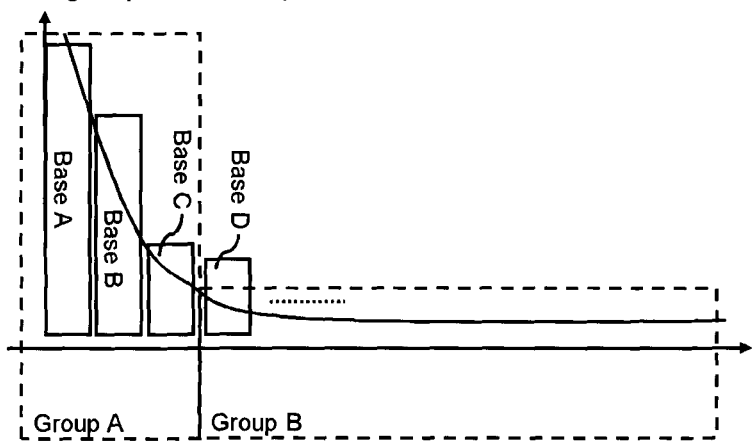
FIG. 27 is a diagram illustrating grouping of bases according to the second embodiment.
FIG. 28 is a configuration diagram of a user list according to the second embodiment.

FIG. 27 is a diagram illustrating grouping of bases according to the second embodiment.

In this embodiment, for example, the respective bases are grouped into two groups (a group A and a group B). As a method of the grouping, for example, as shown in FIG. 27, a predetermined number of (e.g., three) bases in which the numbers of times of movement are larger are grouped as the group A and the other bases are grouped as the group B. Note that the grouping is not limited to this. For example, one or more bases in which the numbers of times of movement are equal to or larger than 50% of the largest number of times of movement may be grouped as the group A and the other bases may be grouped as the group B.

In the realizing method 3, a total number of times of movement to the bases belonging to the group A (a group A total number of times of movement) and a total number of times of movement to the bases belonging to the group B (a group B total number of times of movement) are compared. A transfer method of a file to the file storage apparatus 30 is varied according to a result of the comparison.

For example, when the group A total number of times of movement is equal to or larger than the group B total number of times of movement, it is considered that tendencies of the movements to the bases of the group A is high. Therefore, a transfer method (a transfer method A) for transferring a file to the file storage devices 30 of the bases of the group A is adopted. When the group A total number of times of movement is smaller than the group B total number of times of movement, it is considered that tendencies of the movements to the respective bases are relatively uniform. Therefore, a transfer method (a transfer method B) for transferring a file to the file storage devices 30 of the respective bases is adopted.

In the realizing method 3, in order to manage the transfer methods corresponding to the tendencies of the movements of the respective users, the user list 133 is stored in the archive storage apparatus 120.

FIG. 28 is a configuration diagram of a user list according to the second embodiment.

The user list 133 stores records (entries) including fields of a user name 133a, a user IP 133b, a session disconnection time 133c, a transfer method 133d, and a band speed 133e.

In the user name 133a, a user name of a user who performs connection to the file storage apparatus 30 is stored. In the user IP 133b, an IP address (a user IP) of the file storage apparatus 30 of a base to which the user belongs is stored. In the session disconnection time 133c, time when a session is disconnected (session disconnection time) is stored. Based on the session disconnection time, it is possible to calculate moving times to the other bases. In the transfer method 133d, a file transfer method corresponding to a tendency of movement to a base of a user in this entry is stored. In this embodiment, the transfer method A or the transfer method B is stored in the transfer method 133d. In the band speed 133e, band speed allowed for a user corresponding to this entry concerning data transfer from the archive storage apparatus 120 is stored.

Figure 29:
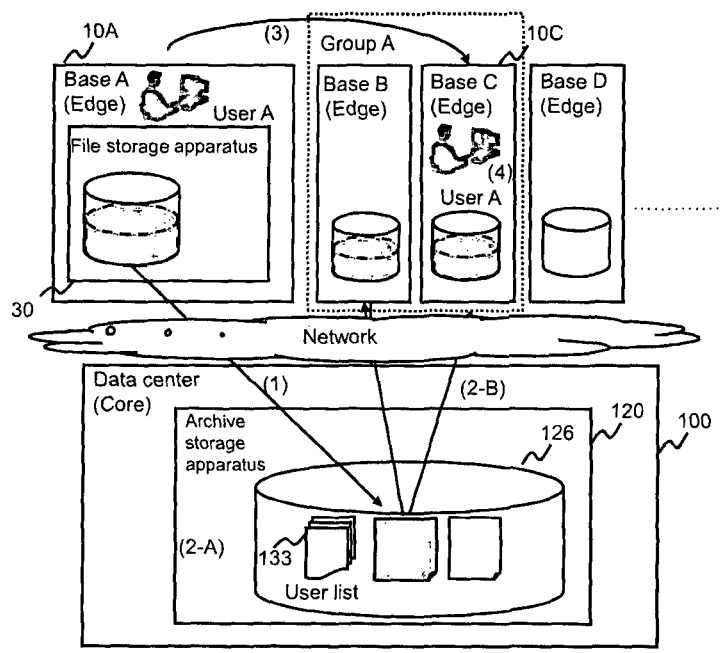
FIG. 29 is a diagram showing an overview of a method A of a realizing method 3 according to the second embodiment.

FIG. 29 is a diagram showing an overview of the transfer method A of the realizing method 3 according to the second embodiment. The transfer method A is executed when a tendency of movement of a user to the base of group A is high.

When the user works in a moving origin base (e.g., the base A) and performs session disconnection, replication of a file from the file storage apparatus 30 to the archive storage apparatus 120 is executed. A session disconnection request is transmitted to the archive storage apparatus 120 ((1) in FIG. 29).

The archive storage apparatus 120 refers to the user list 133 and specifies a transfer method (assumed to be the transfer method A) referring to the transfer method 133*d* of the user who performs the session disconnection request ((2-A) in FIG. 29).

Subsequently, the archive storage apparatus 120 preferentially selects one or more files (including actual data) having the latest last access date and times in a home directory of the user who performs the session disconnection request. The archive storage apparatus 120 transmits the selected files to the file storage devices 30 of the respective bases (the base B and the base C) belonging to the group A ((2-B) in FIG. 29).

Thereafter, when the user moves from the base A at the moving origin to the base C belonging to the group A ((3) in FIG. 29), if the user performs session connection to the file storage apparatus 30 of the base C and refers to a file, since the actual data of the one or more files are already recalled to the base C, the user can quickly refer to the files ((4) in FIG. 29).

Consequently, when a tendency of movement of the user to a base of the group A is high, the files are stored in the base of the group A. Therefore, it is highly likely that the user can quickly refer to the files in the base at the moving destination.

Figure 30:
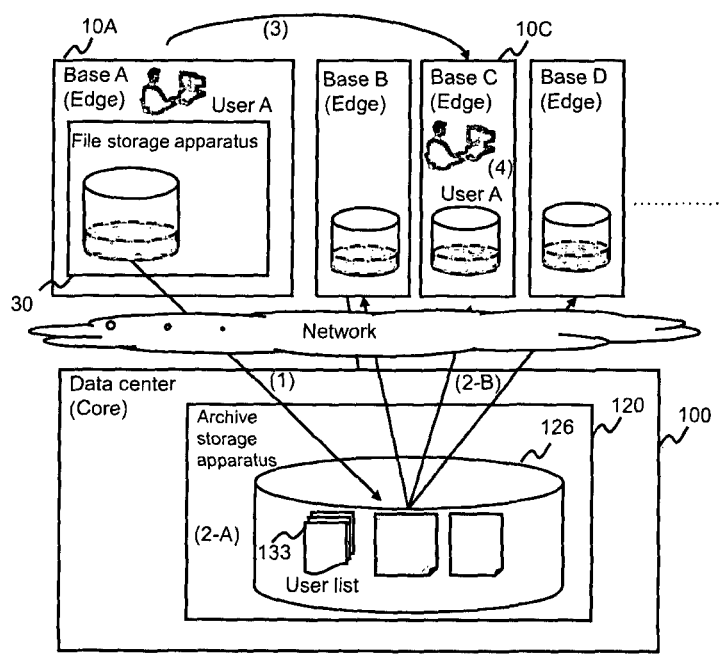
FIG. 30 is a diagram showing an overview of a method B of the realizing method 3 according to the second embodiment.

FIG. 30 is a diagram showing an overview of the transfer method B of the realizing method 3 according to the second embodiment. The transfer method B is executed when it is highly likely that a user tends to relatively uniformly to the respective bases.

When the user works in a moving origin base (e.g., the base A) and performs session disconnection, replication of a file from the file storage apparatus 30 to the archive storage apparatus 120 is executed. A session disconnection request is transmitted to the archive storage apparatus 120 ((1) in FIG. 30).

The archive storage apparatus 120 refers to the user list 133 and specifies a transfer method (assumed to be the transfer method B) referring to the transfer method 133*d* of the user who performs the session disconnection request ((2-A) in FIG. 30).

Subsequently, the archive storage apparatus 120 preferentially selects one or more files (including actual data) having the latest last access date and times in a home directory of the user who performs the session disconnection request. The archive storage apparatus 120 transmits the selected files to the file storage devices 30 of all the bases ((2-B) in FIG. 30). Note that, since the files are transmitted to all the bases, files equivalent to a data amount smaller than a data amount of the transfer method A are selected.

Thereafter, when the user moves from the base A at the moving origin to the base C at the moving destination ((3) in FIG. 30), if the user performs session connection to the file storage apparatus 30 of the base C and refers to a file, since the actual data of the one or more files are already recalled to the base C, the user can quickly refer to the files ((4) in FIG. 30). Note that, irrespective of to which base the user moves, it is highly likely that the user can quickly refer to the files.

Consequently, when the user tends to relatively uniformly move to the respective bases, the files are stored in the respective bases. Therefore, it is highly likely that the user can quickly refer to the files in the base at the moving destination.

Next, processing performed in the second embodiment is explained.

Figure 31:
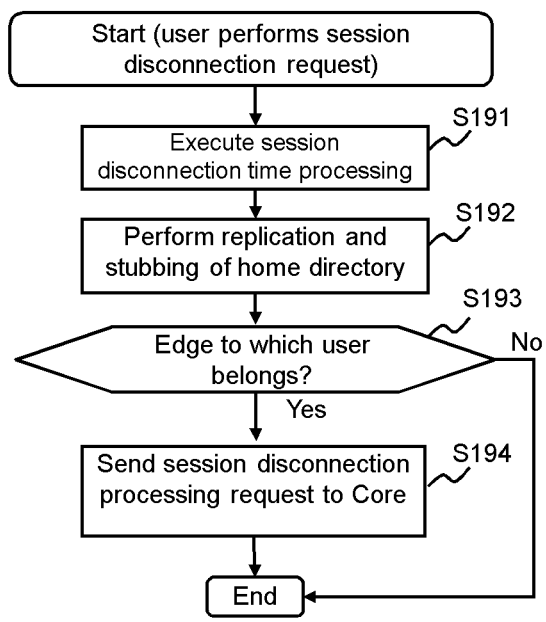
FIG. 31 is a flowchart of a session disconnection processing on an Edge side according to the second embodiment.

FIG. 31 is a flowchart of a session disconnection processing on an Edge side according to the second embodiment.

The session disconnection processing on the Edge side is executed when the file storage apparatus 30 receives a session disconnection request from the client/host 40.

The file storage apparatus 30 executes session disconnection processing between the client/host 40 and the file storage apparatus 30 (step S191). Subsequently, the file storage apparatus 30 executes replication and stubbing of a home directory of the user who requests session disconnection (step S192). This processing is processing same as step S17 in FIG. 10 according to the first embodiment.

Subsequently, the file storage apparatus 30 determines whether the session-disconnected Edge 10 is the Edge 10 to which the user who requests disconnection belongs (step S193).

As a result of the determination, when the session-disconnected Edge 10 is the Edge 10 to which the user belongs (step S193: Yes), the file storage apparatus 30 performs a request for processing during session disconnection to the archive storage apparatus 120 of the Core 100 (step S194) and ends the session disconnection processing. On the other hand, when the session-disconnected Edge 10 is not the Edge 10 of the user (step S193: No), the file storage apparatus 30 ends the session disconnection processing.

Figure 32:
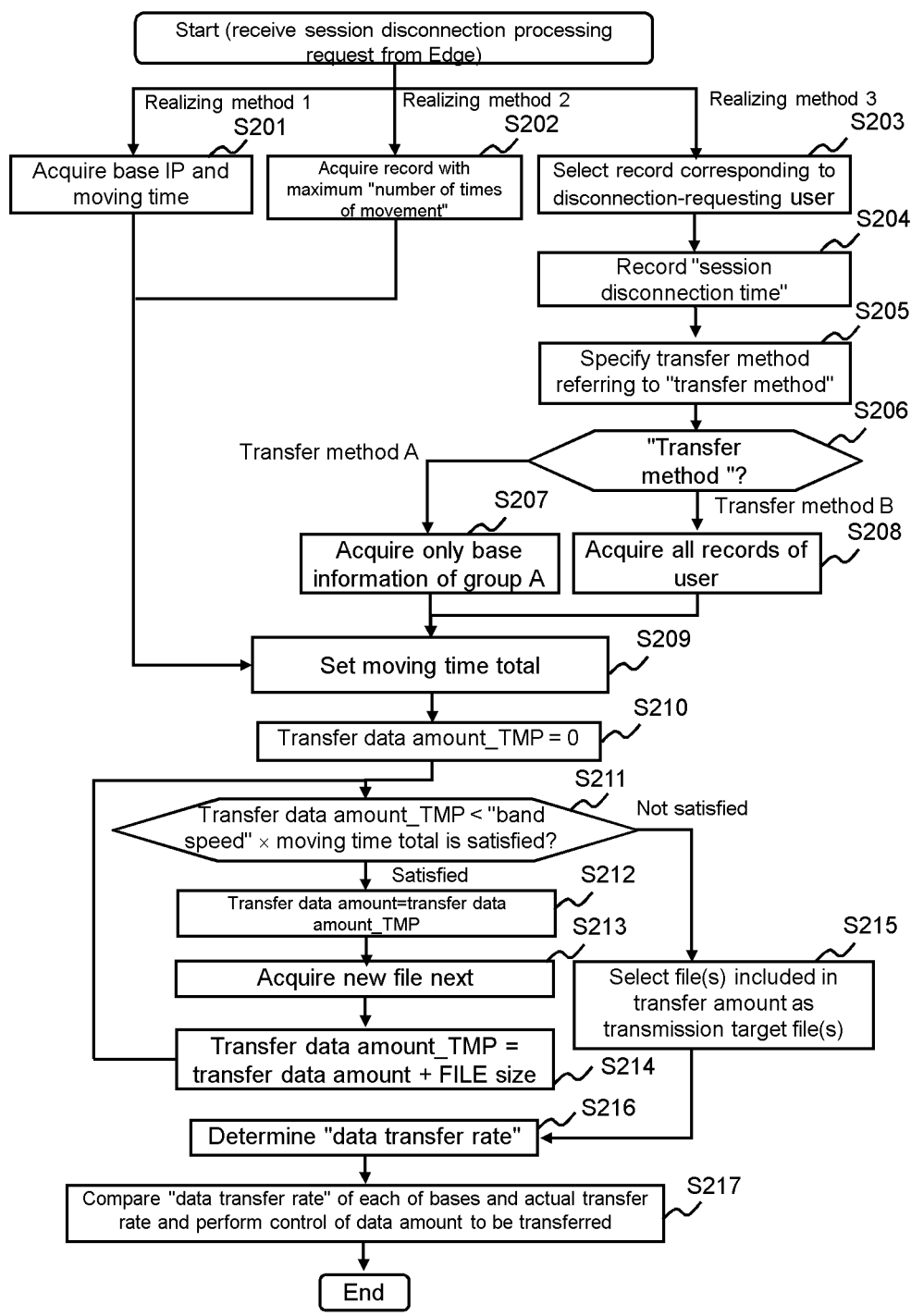
FIG. 32 is a flowchart of a processing during session disconnection on a Core side according to the second embodiment.

FIG. 32 is a flowchart of a processing during session disconnection on the Core side according to the second embodiment. Not that, in the flowchart of FIG. 32, for convenience, processing in the realizing method 1 through processing in the realizing method 3 are collectively described. However, actually, processing in a section corresponding to any one of the realizing methods adopted by the archive storage apparatus 120 is executed.

The processing during session disconnection on the Core side is executed when the archive storage apparatus 120 receives the request for processing during session disconnection in step s194 in FIG. 31 from the file storage apparatus 30.

When the archive storage apparatus 120 adopts the realizing method 1, upon receiving the session disconnection processing request, the archive storage apparatus 120 acquires an IP address of a moving destination base and a moving time from the setting file 131 (step S201), sets the acquired moving time in a variable "moving time total" (step S209), and advances the processing to step S210.

When the archive storage apparatus 120 adopts the realizing method 2, upon receiving the processing during session disconnection request, the archive storage apparatus 120 acquires, from the base list 132, a record in which the number of times of movement of the number of times of movement 132*d* is the largest among records corresponding to a disconnecting user name (step S202), sets a moving average time of the average moving time 132*e* of the record in the variable "moving time total" (step S209), and advances the processing to step S210.

When the archive storage apparatus 120 adopts the realizing method 3, upon receiving the processing during session disconnection request, the archive storage apparatus 120 selects, from the user list 133, a record in which a user IP of the user who requests disconnection is set (step S203). Subsequently, the archive storage apparatus 120 records, in the session disconnection time 133c of the selected record, session disconnection time included in the processing during session disconnection request (step S204). Subsequently, the archive storage apparatus 120 specifies a transfer method referring to the transfer method 133d of the selected record (step S205) and determines whether the transfer method is the transfer method A or the transfer method B (step S206).

As a result of the determination, when the transfer method is the transfer method A (step S206: transfer method A), the archive storage apparatus 120 acquires, from the base list 132, records of bases belonging to the group A corresponding to the user (step S207), sets a sum of average moving times of the average moving time 132e of the acquired all records in the variable "moving time total" (step S209), and advances the processing to step S210.

On the other hand, when the transfer method is the transfer method B (step S206: transfer method B), the archive storage apparatus 120 acquires, from the base list 132, all records corresponding to the user who request disconnection (step S208), sets a sum of average moving times of the average moving time 132e of all the acquired records in the variable "moving time total" (step S209), and advances the processing to step S210.

In step S210, the archive storage apparatus 120 sets 0 in a variable "transfer data amount_TMP". Subsequently, the archive storage apparatus 120 determines whether (Expression 2) variable "transfer data amount_TMP"<band speed× variable "moving time total" is satisfied (step S211). In the realizing method 3, the band speed is a value of the band speed 133e of a record of the user who requests disconnection in the user list 133. In the realizing method 2 and the realizing method 1, the band speed is predetermined band speed.

As a result of the determination, when (Expression 2) is satisfied (step S211: satisfied), the archive storage apparatus 120 sets a value of the variable "transfer data amount_TMP" in a variable "transferred data amount" (step S212). Subsequently, the archive storage apparatus 120 acquires a file in which a last access date and time of the last access date and time 220e is the latest following a file reflected on the transfer data amount among files belonging to the home directory of the user who requests disconnection (step S213). Note that, when a file reflected on the transfer data amount is not present, the archive storage apparatus 120 acquires a file in which a last access date and time of the last access date and time 220e is the latest among the files belonging to the home directory of the user who requests disconnection.

Subsequently, the archive storage apparatus 120 sets, in the variable "transfer data amount_TMP", a value obtained by reflecting (adding) a size of the file acquired in step S213 on the variable "transfer data amount" (step S214) and advances the processing to step S211.

When (Expression 2) is not satisfied in step S211 (step S211: not satisfied), this means that, concerning the file reflected on the transfer data amount_TMP, data transfer cannot be performed within time indicated by the moving time total. Therefore, the archive storage apparatus 120 selects, as a transmission target file, a file reflected on the present variable "transfer data amount" (the file reflected when it is determined in the last determination in step S211 that (Expression 2) is satisfied) (step S215).

Subsequently, the archive storage apparatus 120 determines a data transfer rate (step S216). For example, the data transfer rate is obtained by dividing a value of the variable "transfer data amount" by an average moving time of the average moving time 132e of a record corresponding to the base at the moving destination of the base list 132.

Subsequently, the archive storage apparatus 120 compares the determined data transfer rate and an actual transfer rate and controls a data amount for transferring the transfer target file to the transmission target file storage apparatus 30 (step S217). Note that, If data cannot be transferred from the archive storage apparatus 120 to the file storage apparatus 30 based on the operation of the archive storage apparatus 120, the data may be transferred to the file storage apparatus 30 using polling by the file storage apparatus 30 explained below.

Next, an example in which the file storage apparatus 30 acquires data of a file from the archive storage apparatus 120 using polling is explained.

Figure 33:
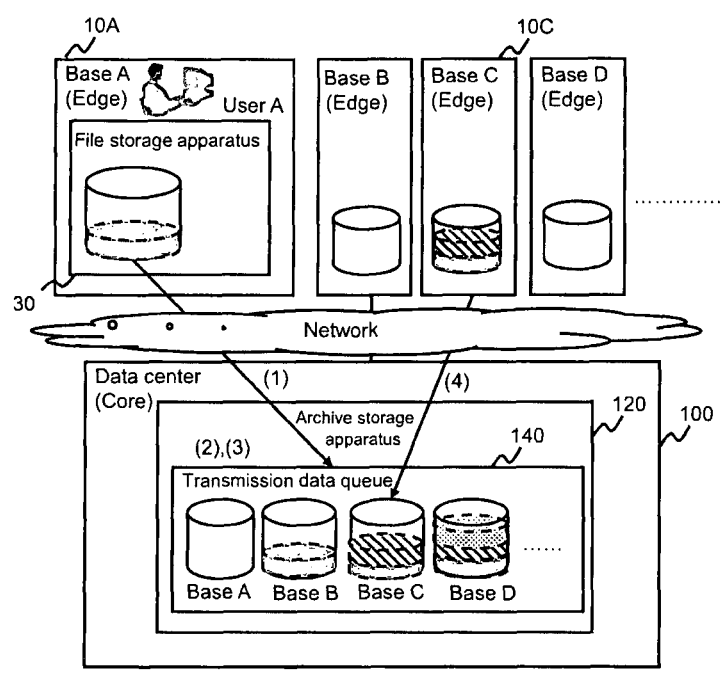
FIG. 33 is a diagram showing an overview of a data acquisition processing by polling according to the second embodiment.

FIG. 33 is a diagram showing an overview of data acquisition processing by polling according to the second embodiment.

When a user works in a moving origin base (e.g., the base A) and performs session disconnection, replication of a file from the file storage apparatus 30 to the archive storage apparatus 120 is executed. A session disconnection request is transmitted to the archive storage apparatus 120 ((1) in FIG. 33).

The archive storage apparatus 120 determines bases at file transfer destinations and a file to be transferred ((2) in FIG. 33). It is assumed that, as the file transfer destinations, the archive storage apparatus 120 determines, for example, the base B, the base C, and the base D.

Subsequently, the archive storage apparatus 120 sets the determined file to be transferred in a queue for a base at a transfer destination of a file of the transmission data queue 140 ((3) in FIG. 33). In this example, data of the file to be transferred is set in queues for the base B, the base C, and the base D.

Thereafter, the file storage devices 30 of the respective bases performs polling, acquires the data of the file set in the queues for the bases in the archive storage apparatus 120 ((4) in FIG. 33), and stores the acquired data in the LU 24.

According to this data acquisition processing, it is possible to appropriately transmit the data of the file to the file storage apparatus 30 to which the data cannot be transferred based on the operation of the archive storage apparatus 120.

Figure 34:
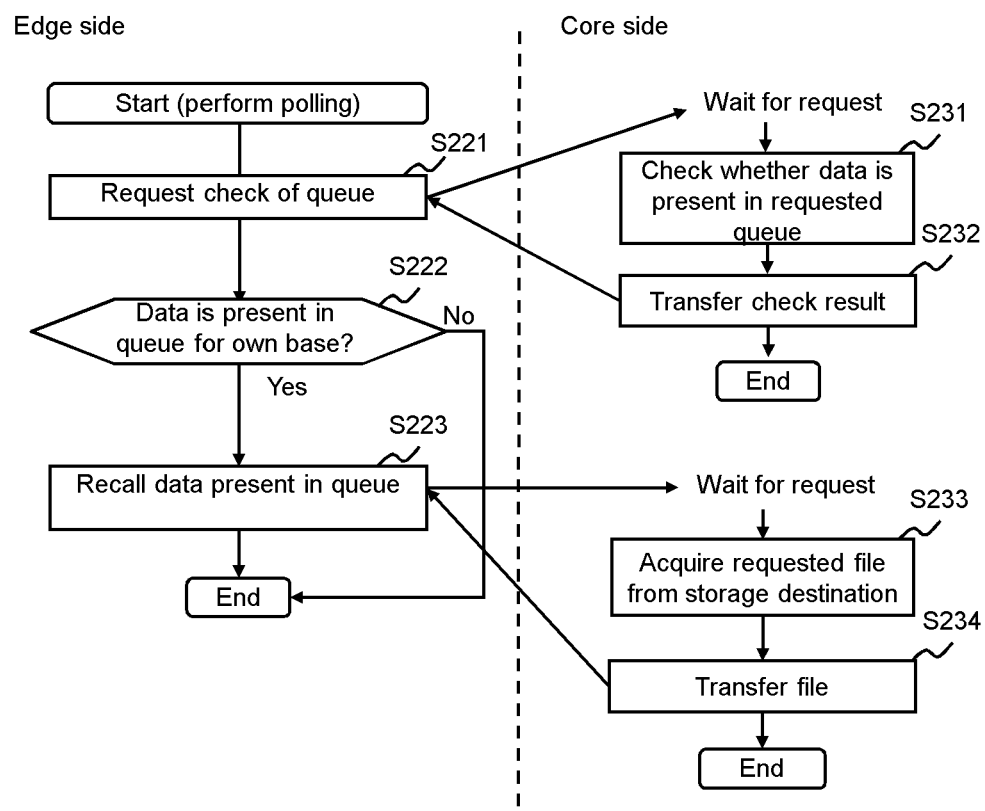
FIG. 34 is a flowchart of the data acquisition processing by polling according to the second embodiment.

FIG. 34 is a flowchart of the data acquisition processing by polling according to the second embodiment.

The file storage apparatus 30 of the Edge 10 transmits, when timing for performing polling comes, a check request for checking whether data is present in a queue for own base to the archive storage apparatus 120 (step S221).

Upon receiving the check request for checking whether data is present in the queue, the archive storage apparatus 120 checks whether data is present in a queue corresponding to the check request, i.e., a queue for a base of the file storage apparatus 30 (for the file storage apparatus 30 itself) (step S231) and transfers a check result to the file storage apparatus 30 (step S232).

Upon receiving the check result, the file storage apparatus 30 determines, on the basis of the check result, whether data is present in the queue for the file storage apparatus 30 itself (step S222). As a result of the determination, when data is present in the queue for the file storage apparatus 30 itself (step S222: Yes), the file storage apparatus 30 recalls data of a file present in the queue (step S223).

In other words, the file storage apparatus 30 transmits a file transfer request to the archive storage apparatus 120. Upon receiving the file transfer request, the archive storage apparatus 120 acquires data of a file corresponding to the transfer request from the queue (step S233) and transfers the data of the file to the file storage apparatus 30 (step S234). Upon receiving the data of the file, the file storage apparatus 30 stores the data in the LU 24 and ends the data acquisition processing.

On the other hand, when data is absent in the queue for the file storage apparatus 30 itself (step S222: No), the file storage apparatus 30 ends the data acquisition processing.

Figure 35:
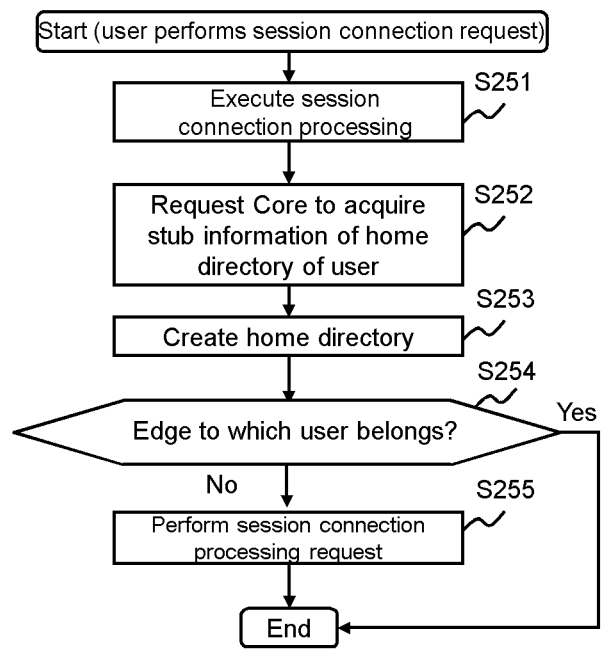
FIG. 35 is a flowchart of a session connection processing on the Edge side according to the second embodiment.

FIG. 35 is a flowchart of a session connection processing on an Edge side according to the second embodiment.

The session connection processing on the Edge side is executed when a session connection request by a user is sent from the client/host 40 to the file storage apparatus 30.

The file storage apparatus 30 performs session connection to the client/host 40 (step S251). Subsequently, the file storage apparatus 30 performs an acquisition request for stub information of a home directory of the user to the archive storage apparatus 120 (step S252). Consequently, stub information of the home directory can be acquired from the archive storage apparatus 120. Subsequently, the file storage apparatus 30 creates a home directory on the basis of the acquired stub information (step S253).

The file storage apparatus 30 determines whether the session-connected Edge 10 (the Edge 10 to which the session-connecting file storage apparatus 30 belongs) is the Edge 10 to which the connecting user belongs (step S254). As a result of the determination, when the session-connected Edge 10 is the Edge 10 to which the connecting user belongs (step S254: Yes), the file storage apparatus 30 ends the processing.

On the other hand, when the session-connected Edge 10 is not the Edge 10 to which the connecting user belongs (step S254: No), the file storage apparatus 30 transmits a session connection processing request to the archive storage apparatus 120 (step S255) and ends the processing. Upon receiving the session connection processing request, the archive storage apparatus 120 executes session connection processing on a Core side shown in FIG. 36.

Figure 36:
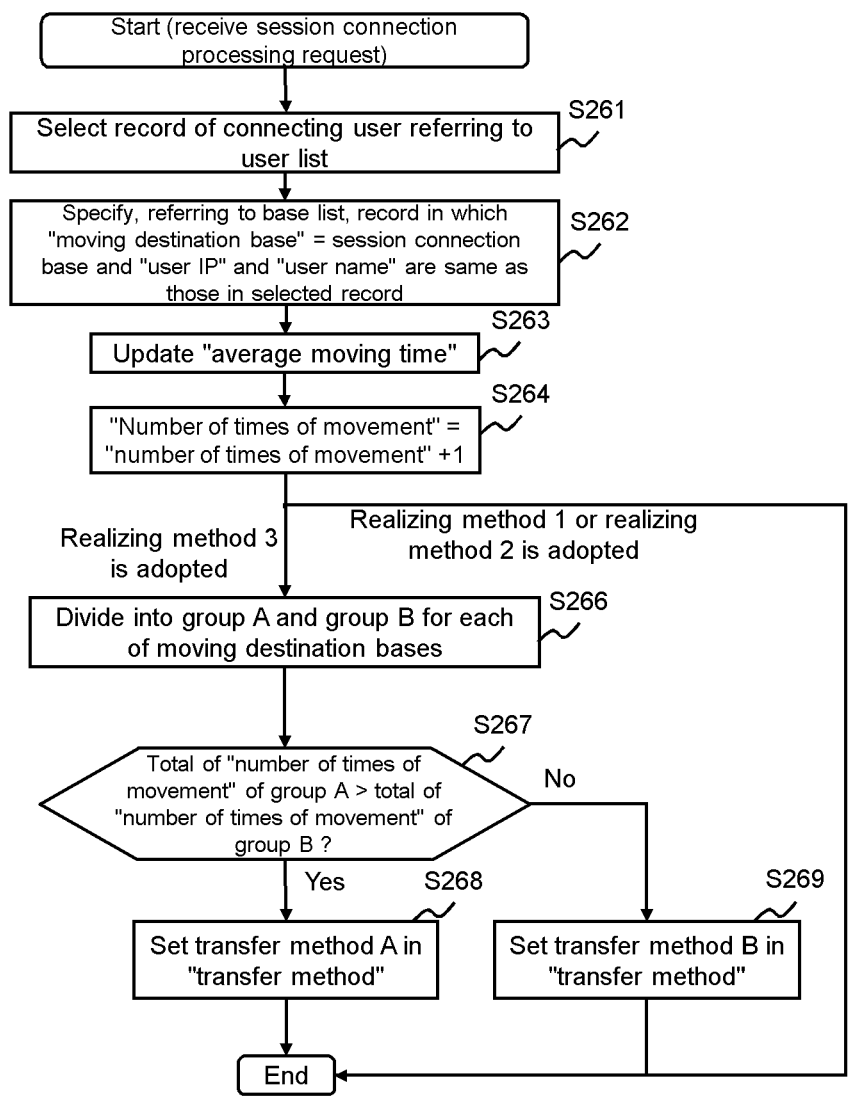
FIG. 36 is a flowchart of a session connection processing on the Core side according to the second embodiment.

FIG. 36 is a flowchart of the session connection processing on the Core side according to the second embodiment.

The session connection processing on the Core side is executed when the archive storage apparatus 120 receives the session connection processing request from the file storage apparatus 30. The session connection processing request includes a user name of a user who requests session connection, an IP address of a connected base, and session connection time.

The archive storage apparatus 120 refers to the user list 133 and selects a record corresponding to the user name of the user who performs the session connection request (step S261). Subsequently, the archive storage apparatus 120 refers to the base list 132 and specifies a record in which a moving destination base of the moving destination base 132b is the IP address of the connected base included in the session connection processing request and a user name of the user name 132a and a user IP of the user IP 132c are a user name of the user name 133a and a user IP of the user IP 133b of the record acquired in step S261 (step S262).

Subsequently, the archive storage apparatus 120 calculates an average moving time according to (Expression 3) below and updates an average moving time of the average moving time 132d of the specified record (step S263). (Expression 3) average moving time=((session connection time in the session connection processing request−session disconnection time of the session disconnection time 133c of the record selected in step S261)+average moving time of the average moving time 132e of the record specified in step S262)/2

Subsequently, the archive storage apparatus 120 adds 1 to the number of times of movement of the number of times of movement 132d of the specified record (step S264). Consequently, an average moving time and the number of times of movement corresponding to actual movement of the base of the user are reflected on the user list 132.

Processing after step S264 is different according to an adopted realizing method. In the realizing method 1 and the realizing method 2, the archive storage apparatus 120 ends the session connection processing. On the other hand, in the case of the realizing method 3, the archive storage apparatus 120 advances the processing to step S266.

In step S266, the archive storage apparatus 120 groups moving destination bases of the moving destination bases 132b into the group A and the group B on the basis of records corresponding to the user name of the session-connecting user in the base list 132.

Further, the archive storage apparatus 120 calculates, on the basis of these records, a total of the numbers of times of movement of the number of times of movement 132d of the records corresponding to the moving destination bases grouped in the group A (a group A number of times of movement total) and a total of the numbers of times of movement of the number of times of movement 132d of the records corresponding to the moving destination bases grouped in the group B (a group B number of times of movement total). The archive storage apparatus 120 determines whether the group A number of times of movement total is larger than the group B number of times of movement total (step S267).

As a result of the determination, when the group A number of times of movement total is larger than the group B number of times of movement total (step S267: Yes), the archive storage apparatus 120 sets the transfer method A in the transfer method 133d of the record selected in step S261 (step S268) and ends the processing.

On the other hand, when the group A number of times of movement total is not larger than the group B number of times of movement total (step S267: No), the archive storage apparatus 120 sets the transfer method B in the transfer method 133d of the record selected in step S261 (step S269) and ends the processing. According to the processing, it is possible to appropriately determine, according to a moving tendency of the base of the user, whether the transfer method is the transfer method A or the transfer method B.

The several embodiments are explained above. However, the embodiments are illustrations for the explanation of the present invention. It is not meant to limit the scope of the present invention to only these embodiments. In other words, the present invention can be carried out in other various forms.

REFERENCE SIGNS LIST

10: Edge, 30: file storage apparatus, 100: Core, 120: archive storage apparatus

The invention claimed is:

1. A file server coupled to a storage device and a remote file server, the file server comprising:
a processor configured to:
store, in the storage device, data of a plurality of files received from a plurality of users;
replicate the data of the files stored in the storage device to the remote file server;

when a session connection request is received from one of the users, send a lock request for a home directory of the one of the users to the remote file server;

when a session disconnection request is received from the one of the users, replicate the data of the files of the one of the users to the remote file server and send an unlock request for the home directory of the one of the users to the remote file server;

manage user management information including identifiers of the users connectable to the file server and a pointer indicating the one of the users which sent the session disconnection request within the predetermined period;

upon receiving the session disconnection request, when an identifier of the one of the users which sent the session disconnection request is lower in order than an identifier of one of the users indicated by the pointer, swap the identifier of the one of the users indicated by the pointer and the identifier indicating the one of the users which sent the session disconnection request; and lower a position of the pointer by 1.

2. A file server according to claim 1, wherein the processor is further configured to:

allocate a plurality of home directories to the respective users; and acquire, upon receiving the session connection request from the one of the users, information concerning the home directory of the one of the users from the remote file server.

3. A file server according to claim 1, wherein the data of the files stored in the storage device are replicated in order of which of the users sent a session disconnection request to the file server earliest within the predetermined period.

4. A file server according to claim 1, wherein the processor is further configured to:

perform the replication periodically.

5. A file server according to claim 1, wherein, the processor is further configured to:

remove, when the processor executes replication of one of the files of a certain user among the users, the one of the users which sent the session disconnection request from the user management information.

6. A file server according to claim 1, wherein, the processor is further configured to:

transmit, upon receiving a session connection request from a certain user among the users or in accessing data of the certain user, a lock request for a home directory of the certain user to the remote file server.

7. A file server according to claim 6, wherein, the processor is further configured to:

transmit, upon receiving a session disconnection request from the certain user or when there is no access from the certain user for a fixed period, an unlock request for the home directory of the certain user to the remote file server.

8. An information system comprising the file server according to claim 1, the information system further comprising:

a local storage apparatus which stores data transmitted from the file server and includes the storage device;

a second file server which is coupled to the plurality of users and is coupled to the remote file server via a communication network;

a second local storage apparatus which stores data transmitted from the second server;

the remote file server; and a remote storage apparatus which stores data transmitted from the remote file server, wherein:

upon receiving a session connection request from a first one of the users, the file server acquires home directory information of the first one of the users from the remote file server, and upon receiving the session connection request from the first one of the users, the second file server acquires the home directory information of the first one of the users from the remote file server.

9. A control method for an information processing system including a file server coupled to a remote file server via a communication network, the control method comprising:

storing data of a plurality of files received from a plurality of users; and replicating the data of the files to the remote file server when a session connection request is received from one of the users, sending a lock request for a home directory of the one of the users to the remote file server;

when a session disconnection request is received from the one of the users, replicating the data of the files of the one of the users to the remote file server and sending an unlock request for the home directory of the one of the users to the remote file server;

managing user management information including identifiers of the users connectable to the file server and a pointer indicating the one of the users which sent the session disconnection request within the predetermined period;

swapping, upon receiving the session disconnection request, when an identifier of the one of the users which sent the session disconnection request is lower in order than an identifier of one of the users indicated by the pointer, the identifier of the one of the users indicated by the pointer and the identifier indicating the one of the users which sent the disconnection request; and lowering a position of the pointer by 1.

10. A control method for an information processing system according to claim 9, further comprising:

allocating a plurality of home directories to the respective users; and acquiring, upon receiving the session connection request from the one of the users, information concerning the home directory of the one of the users from the remote file server.

11. A control method for an information processing system according to claim 9, wherein the data of the files are replicated in order of which of the users sent a session disconnection request to the file server earliest within the predetermined period.

12. A control method for an information processing system according to claim 9, further comprising:

removing, when executing replication of one of the files of a certain user among the users, the one of the users which sent the session disconnection request from the user management information.

13. A control method for an information processing system according to claim 9, further comprising:

transmitting, upon receiving a session connection request from a certain user among the users or in accessing data of the certain user, a lock request for a home directory of the certain user to the remote file server; and transmitting, upon receiving a session disconnection request from the certain user or when there is no access from the certain user for a fixed period, an unlock request for the home directory of the certain user to the remote file server.

14. A file server according to claim 1, wherein the processor is configured to:
   stub one or more of the files stored in the storage device; and
   upon receiving an access request from the one of the users,
   when one of the files related to the access request is not stubbed, read data of the one of the files from the storage device and transmit the data of the one of the files to the one of the users, and
   when the one of the files related to the access request is stubbed, recall the data of the one of the files from the remote file server and transmit the data of the one of the files to the one of the users.

15. A file server according to claim 1, wherein the processor is configured to:
   send an unlock request of the files of the one of the users, which sent the session disconnection request to the file server, to the remote file server after replicating the data of the user.

16. A control method for an information processing system according to claim 9, further comprising:
   stubbing one or more of the files stored in the storage device; and
   upon receiving an access request from the one of the users,
   when one of the files related to the access request is not stubbed, reading data of the one of the files from the storage device and transmitting the data of the one of the files to the one of the users, and
   when the one of the files related to the access request is stubbed, recalling the data of the one of the files from the remote file server and transmitting the data of the one of the files to the one of the users.

17. A control method for an information processing system according to claim 9, further comprising:
   sending an unlock request of the files of the one of the users, which sent the session disconnection request to the file server, to the remote file server after replicating the data of the user.

* * * * *